United States Patent
Robie, Jr. et al.

(10) Patent No.: US 7,283,568 B2
(45) Date of Patent: Oct. 16, 2007

(54) METHODS, SYSTEMS AND COMPUTER PROGRAM PRODUCTS FOR SYNCHRONIZING CLOCKS OF NODES ON A COMPUTER NETWORK

(75) Inventors: Edward Adams Robie, Jr., Raleigh, NC (US); Jeffrey Todd Hicks, Cary, NC (US); John Lee Wood, Raleigh, NC (US)

(73) Assignee: NetIQ Corporation, Houston, TX (US)

( * ) Notice: Subject to any disclaimer, the term of this patent is extended or adjusted under 35 U.S.C. 154(b) by 1130 days.

(21) Appl. No.: 09/951,031

(22) Filed: Sep. 11, 2001

(65) Prior Publication Data

US 2003/0048811 A1    Mar. 13, 2003

(51) Int. Cl.
*H04J 3/06*    (2006.01)
(52) U.S. Cl. .................. 370/503; 327/144; 375/356
(58) Field of Classification Search .................. None
See application file for complete search history.

(56) References Cited

U.S. PATENT DOCUMENTS

| 5,408,506 | A | * | 4/1995 | Mincher et al. | 375/134 |
| 5,907,685 | A | * | 5/1999 | Douceur | 709/248 |
| 6,157,957 | A | * | 12/2000 | Berthaud | 709/248 |
| 6,654,356 | B1 | * | 11/2003 | Eidson et al. | 370/303 |
| 6,751,573 | B1 | * | 6/2004 | Burch | 702/178 |
| 2002/0131370 | A1 | * | 9/2002 | Chuah et al. | 370/252 |
| 2002/0186716 | A1 | * | 12/2002 | Eidson | 370/503 |

OTHER PUBLICATIONS

Birger, *Getting in Sync: A Look at NTP*, Spirentcom.com, 1$^{st}$ Quarter 2001, pp. 14-15.
Mills, *Network Time Protocol (Version 3) Specification, Implementation and Analysis*, Network Working Group, Request for Comments-1305, Mar. 1992.

* cited by examiner

*Primary Examiner*—Bob A. Phunkulh
(74) *Attorney, Agent, or Firm*—Myers Bigel Sibley & Sajovec PA

(57) ABSTRACT

Methods, systems and computer program products are provided for synchronizing clocks in a computer network. A first node clock is synchronized to a second node clock by establishing an initial value of a virtual second node clock at the first node. The initial value may be established based on the first node clock and a timing record received from the second node. A frequency bias adjustment factor is determined for the virtual second node clock based on a plurality of clock requests from the first node and a plurality of corresponding responses from the second node spaced apart in time. The responses from the second node include the timing record based on the second node clock. A time of the virtual second node clock is provided based on the frequency bias adjustment factor responsive to requests for the virtual second node clock at a time between requests.

70 Claims, 13 Drawing Sheets

METHODS, SYSTEMS AND COMPUTER PROGRAM PRODUCTS FOR SYNCHRONIZING CLOCKS OF NODES ON A COMPUTER NETWORK

FIELD OF THE INVENTION

The present invention, generally, relates to network communication methods, systems and computer program products and, more particularly, to methods, systems and computer program products for synchronizing nodes on a computer network.

BACKGROUND OF THE INVENTION

Due to the wide spread use of computers in today's society, networked computers are beginning to be equipped with devices and applications that are replacing many of the traditional devices people use every day. For example, computers equipped with Digital Versatile Disks (DVD) may be used in place of a television set, CD ROMs may also double as CD players thus replacing the traditional radio or stereo and, recently, computer networks have been used in place of the modem telephone network. These new applications have put a larger burden on the information technology (IT) organizations that work to provide reliable application performance on a 24-hour, 7-day-a-week basis. This is due to the fact that user perception of the performance of these applications is not based on prior computer applications but instead on their experiences with the traditional devices, i.e. television, radio or telephone.

Many of these new applications require real-time performance which was not required for previous computer applications. For example, a user making a telephone call over a computer network expects the call to sound like a typical call over a telephone network and does not expect the call to be interrupted by periodic delays due to computer network traffic. In reality, a telephone call made over a computer network, for example, the Internet, is not implemented like a telephone call over a traditional telephone line. Internet calls typically rely on codec hardware and/or software for voice digitization so as to provide packetized voice communication. In other words, the conversation is digitized using the codec, the digitized conversation is placed into packets, the packets are transmitted over the network and then converted back to a voice signal for receipt by the receiving device (or person). Ideally, all of this digitizing and conversion should be transparent to a user.

Many of these new applications, especially distributed Internet applications, require accurate endpoint clock synchronization. Network clocks may vary significantly from one endpoint of a network to another endpoint. One protocol currently being used to synchronize endpoint clocks in a network is the Network Time Protocol (NTP). NTP is an Internet standard protocol and may be used to organize and maintain a set of timeservers and transmission paths as a synchronization subnet. An NTP network usually gets its time from an authoritative time source. This authoritative time source may be an external time source, such as a Global Positioning System (GPS), a designated machine or group of machines within the network, a radio clock, an atomic clock attached to a timeserver, or the like. An NTP host, which may be a server and/or a client, may distribute this authoritative time, i e. a Universal Coordinated Time (UTC), across the network. The UTC is accepted as the actual time and each additional timeserver is assigned a stratum level that corresponds with the individual timeserver's distance from an accurate time source. For example, a stratum-1 server usually has direct access to a UTC time source, a stratum-2 server receives its synchronization information from a stratum 1 server and so on.

Synchronizing a client to a network server using NTP generally consists of several packet exchanges where each exchange comprises a request from the client to a server and a corresponding reply from the server to the client. The client and the sever may both be NTP hosts as discussed above. Each NTP host estimates UTC from samples received from a plurality of other NTP hosts. In other words, the UTC time is not believed by a server/client until several packet exchanges have taken place. For example, the client stores its local time into the packet being sent. When a server receives such a packet with the client's local time, the server will store its own estimate of the current time into the packet and return the packet to the client. Upon receipt, the client once again stores its own time. This timing information may be used to estimate the travel time of the packet, i.e. round trip time of the packet. The round trip time may then be used to estimate current time. If the server is sending clock values that are statistically incompatible with clock values sent by other servers, this server/client may be considered an invalid NTP host. Although NTP is a very accurate method of synchronizing endpoint clocks, it may require special equipment, such as a stratum 1 clock directly attached to each endpoint, which may not be desirable for certain types of applications.

SUMMARY OF THE INVENTION

Embodiments of the present invention provide methods, systems and computer program products for synchronizing clocks at a plurality of nodes in a network. An initial value of a virtual second node clock is established at a first node. The initial value of the virtual second node clock is established based on a first node clock and a timing record received from the second node based on a second node clock responsive to a clock request from the first node to the second node. In addition, a frequency bias adjustment factor for the virtual second node clock is determined based on a plurality of clock requests from the first node and a plurality of corresponding responses from the second node that are spaced apart in time. Ones of the responses from the second node include a timing record based on the second node clock. A time of the virtual second node clock may be provided responsive to requests for the virtual second node clock at a time between clock requests using the frequency bias adjustment factor.

In other embodiments of the present invention, values of the virtual second node clock are updated based on ones of the corresponding responses from the second node. A virtual second node clock may be established by determining a one way delay between the first node and the second node. The one way delay may be determined based on a time of transmission of the clock request from the first node and a time of receipt of the corresponding response from the second node at the first node. The one way delay may be determined by determining the difference between the time of receipt and the time of transmission to provide a round trip delay and then dividing the round trip delay by two to provide a one way delay.

In further embodiments of the present invention, an updated initial value of a virtual second node clock is established at the first node. The updated initial value may be based on the first node clock and a timing record received from the second node based on a second node clock responsive to a clock request from the first node to the second node. This updated initial value may be used to determine a jitter. The jitter may be determined based on a comparison of the updated initial value of the virtual second node clock and a calculated value of the virtual second node clock based on the initial value of the virtual second node clock. A skew rate may be determined for the updated initial value of the second node clock based on the determined jitter.

In other embodiments of the present invention, it is determined if the skew rate satisfies an acceptance criteria. If the skew rate satisfies the acceptance criteria, a long polling mode having an associated resynchronization period may be entered. If long polling mode is entered the skew rate may be used as a phase adjustment. If the skew rate does not satisfy the acceptance criteria, a short polling mode having an associated resynchronization period may be entered. The resynchronization period of the long polling mode may be longer than the resynchronization period of the short polling mode. The resynchronization periods of the long polling mode and the short polling mode may be adaptively determined based on the jitter calculated at each resynchronization period. The resynchronization periods of the long polling mode may typically be longer than twenty minutes. The resynchronization periods of the short polling mode may typically be shorter than five minutes. A first criterion and a second criterion may be used to determine if the resynchronization periods should be lengthened or shortened.

In further embodiments of the present invention a virtual second node clock and a virtual third node clock are maintained at a first node. The value of the virtual second node clock is maintained based on the first node clock and a timing record received from the second node based on the second node clock. The value of the virtual third node clock is maintained based on the first node clock and a timing record received from the third node based on the third node clock. The first node clock may thus be independently synchronized to a plurality of other nodes without the use of a universal clock.

The virtual second node clock may further be maintained by updating the virtual second node clock based on subsequent timing records received from the second node to provide an updated virtual second node clock. The virtual third node clock may further be maintained by updating the virtual third node clock based on subsequent timing records received from the third node to provide an updated virtual third node clock. In other embodiments of the present invention a frequency bias adjustment factor may be determined for the virtual second node clock and the virtual third node clock. A time of the virtual second node clock and the virtual third node clock may be provided upon request based on the frequency bias adjustment factor.

In further embodiments of the present invention a jitter may be determined for the virtual second node clock based on a comparison of the updated virtual second node clock and a calculated value of the virtual second node clock. A skew rate may be determined for the second node clock based on the jitter. A value for the virtual second node clock may be determined based on the frequency bias and the skew rate. Similarly, a jitter may be determined for the virtual third node clock based on a comparison of the updated virtual third node clock and a calculated value of the virtual third node clock. A skew rate may be determined for the virtual third node clock based on the jitter and a value for the virtual third node clock may be determined based on the frequency bias and the skew rate.

In further embodiments of the present invention, a first node clock is synchronized with a second node clock based on a plurality of clock requests from the first node and a plurality of corresponding responses from the second node. A one way delay is generated based on transmission times of the plurality of clock requests from the first node and a plurality of reception times of the plurality of corresponding responses from the second node. A virtual clock is established at the first node of a computer network based on the one way delay.

The one way delay may be generated by determining the difference between ones of the transmission times of the plurality of clock requests from the first node to the second node and ones of the reception times of the plurality of corresponding responses at the first node to provide a plurality of first node differences. A plurality of second node differences may be provided by determining the difference between a plurality of reception times of the plurality of clock requests at the second node and a plurality of transmission times of the plurality of corresponding responses from the second node to the first node. The difference between ones of the first node differences and the second node differences may be determined to provide a plurality of round trip delays. The plurality of round trip delays may be averaged to provide an average round trip delay. Finally, the one way delay may be determined by dividing the round trip delay by two.

While the present invention is described above primarily with reference to methods, systems and computer program products are also provided.

DETAILED DESCRIPTION OF THE INVENTION

Figure 1:
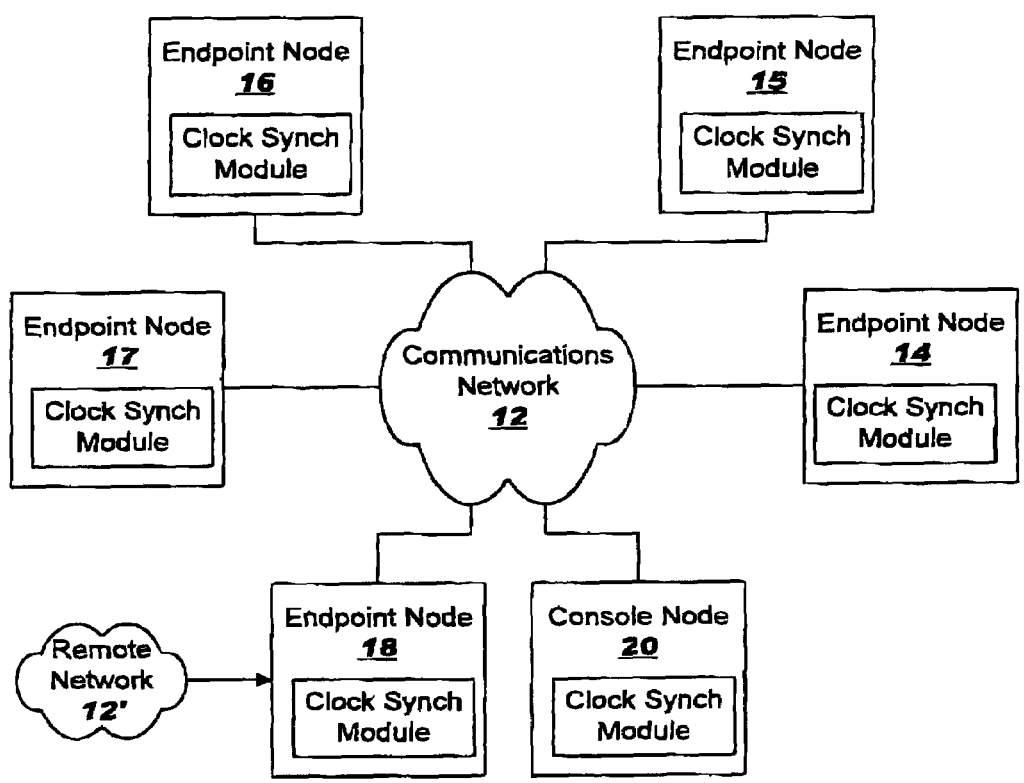
FIG. 1 is a block diagram of a hardware and software environment in which the present invention may operate according to embodiments of the present invention.

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

As will be appreciated by one of skill in the art, the present invention may be embodied as a method, data processing system, or computer program product. Accordingly, the present invention may take the form of an entirely hardware embodiment, an entirely software embodiment or an embodiment combining software and hardware aspects all generally referred to herein as a "circuit" or "module." Furthermore, the present invention may take the form of a computer program product on a computer-usable storage medium having computer-usable program code means embodied in the medium. Any suitable computer readable medium may be utilized including hard disks, CD-ROMs, optical storage devices, a transmission media such as those supporting the Internet or an intranet, or magnetic storage devices.

Computer program code for carrying out operations of the present invention may be written in an object oriented programming language such as Java® or C++. However, the computer program code for carrying out operations of the present invention may also be written in conventional procedural programming languages, such as the "C" programming language or assembly language. The program code may execute entirely on the user's computer, partly on the user's computer, as a stand alone software package, partly on the user's computer and partly on a remote computer, or entirely on the remote computer. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the acts specified in the flowchart and/or block diagram block or blocks.

These computer program instructions may also be stored in a computer-readable memory that can direct a computer or other programmable data processing apparatus to operate in a particular manner, such that the instructions stored in the computer-readable memory produce an article of manufacture including instruction means which implement the acts specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the acts specified in the flowchart and/or block diagram block or blocks.

The present invention will now be described with reference to the embodiments illustrated in the figures. A hardware and software environment in which the present invention can operate in support of packetized voice communication testing as shown in FIG. 1 will now be described. The present invention includes methods, systems and computer program products for synchronizing clocks in a communications network 12. Communications network 12 provides a communication link between endpoint nodes 14, 15, 16, 17, 18 and console node 20 which may support, for example, packetized voice communications between the endpoint nodes 14, 15, 16, 17, 18. Each of the endpoint nodes 14, 15, 16, 17, 18 and the console node 20 may be equipped with the clock synchronization module according to embodiments of the present invention.

As will be understood by those having skill in the art, a communications network 12 may be comprised of a plurality of separate linked physical communication networks which, using a protocol such as the Internet protocol, may appear to be a single seamless communications network to user application programs. For example, as illustrated in FIG. 1, remote network 12' and communications network 12 may both include a communication node at endpoint node 18. Accordingly, additional endpoint nodes (not shown) on remote network 12' may be made available for communications from endpoint nodes 14, 15, 16, 17. It is further to be understood that, while for illustration purposes in FIG. 1 communications network 12 is shown as a single network, it may be comprised of a plurality of separate interconnected physical networks. As illustrated in FIG. 1, endpoint nodes 14, 15, 16, 17, 18 may reside on a computer. As illustrated by endpoint node 18, a single computer may comprise multiple endpoint nodes.

The clock synchronization module of the present invention may be included in each endpoint node of a network, and used to synchronize clocks, for example, during performance testing. If the clock synchronization module of the present invention is used during performance testing, console node 20 may be designated to initiate and/or control this performance testing. The present invention synchronizes clocks of nodes in a communications network 12 using controlled transmission of clock request packets and reception of corresponding response packets between the various endpoint nodes 14, 15, 16, 17, 18 in communications network 12. It will be understood that any endpoint node may be associated with any other endpoint node to define an endpoint node pair. It will also be understood that any endpoint node may be associated with a plurality of additional endpoint nodes to define a plurality of endpoint node pairs and may maintain clock synchronization with each of the plurality of other endpoint nodes without the use of a universal clock.

If the clock synchronization module of the present invention is used in conjunction with performance testing, console node 20, or other means for controlling testing of network 12, may obtain user input, for example by keyed input to a computer terminal, to determine a desired test. Console node 20, or other control means may further define a test scenario to emulate/simulate, for example, packetized voice communications traffic between a plurality of selected endpoint nodes 14, 15, 16, 17, 18. The test scenario may be an endpoint pair based test scenario using clocks in accordance with embodiments of the present invention for generation of one or more network measurements, such as one-way delay between two nodes. Each endpoint node 14, 15, 16, 17, 18 may be provided endpoint node information, including an endpoint node specific network communication test protocol based on the packetized voice communication traffic expected, to provide a test scenario which simulates/emulates the voice communication traffic.

Console node 20 may construct the test scenario including the underlying test protocols and console node 20 or other initiating means initiates execution of network test protocols for testing network performance. Test protocols may contain all of the information about a performance test including which endpoint nodes 14, 15, 16, 17, 18 to use and what test protocol and network protocol to use for communications between each pair of the endpoint nodes. The test protocol for a pair of the endpoint nodes may include a test protocol script. A given test may include network communications test protocols including a plurality of different test protocol scripts. The console node 20 may also generate an overall transmission quality rating for the network 12. A more complete description of performance testing operations for a packetized voice network is provided in concurrently filed U.S. patent application Ser. No. 09/951,050, entitled "Methods, Systems and Computer Program Products for Packetized Voice Network Evaluation" which is incorporated herein by reference as if set forth in its entirety.

Figure 2:
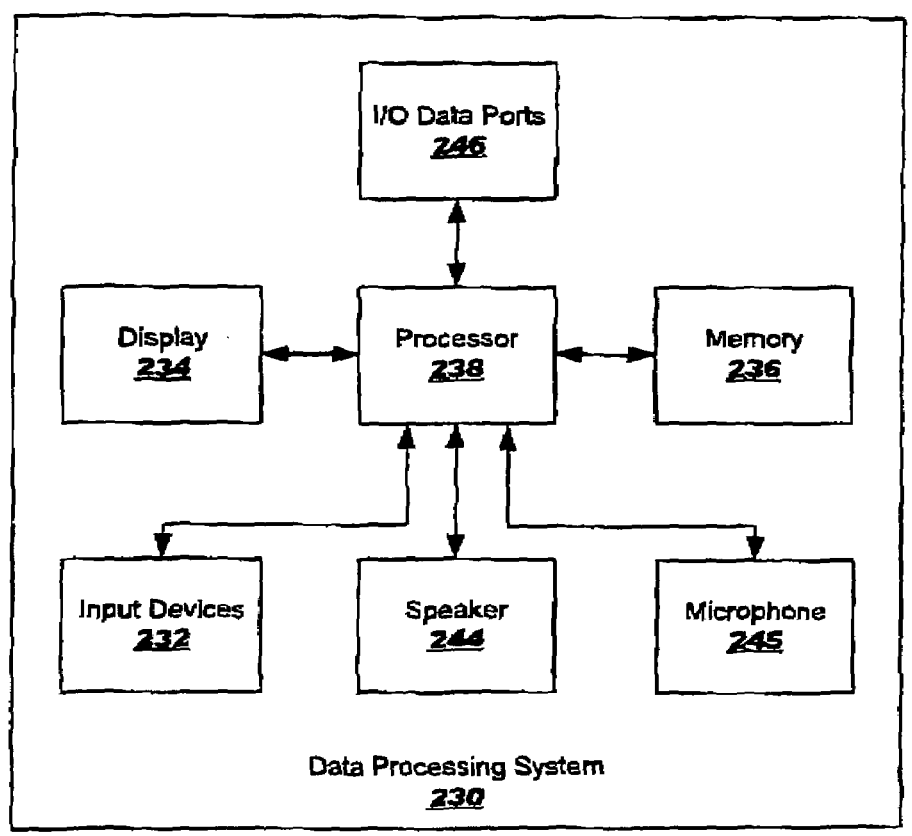
FIG. 2 is a block diagram of a data processing system according to embodiments of the present invention.

FIG. 2 illustrates an exemplary embodiment of a data processing system 230 in accordance with embodiments of the present invention. The data processing system 230 typically includes input device(s) 232 such as a keyboard or keypad, a display 234, and a memory 236 that communicate with a processor 238. The data processing system 230 may further include a speaker 244, a microphone 245, and an I/O data port(s) 246 that also communicate with the processor 238. The I/O data ports 246 can be used to transfer information between the data processing system 230 and another computer system or a network 12, for example, using an internet protocol (IP) connection. These components may be conventional components such as those used in many conventional data processing systems which may be configured to operate as described herein.

Figure 3:
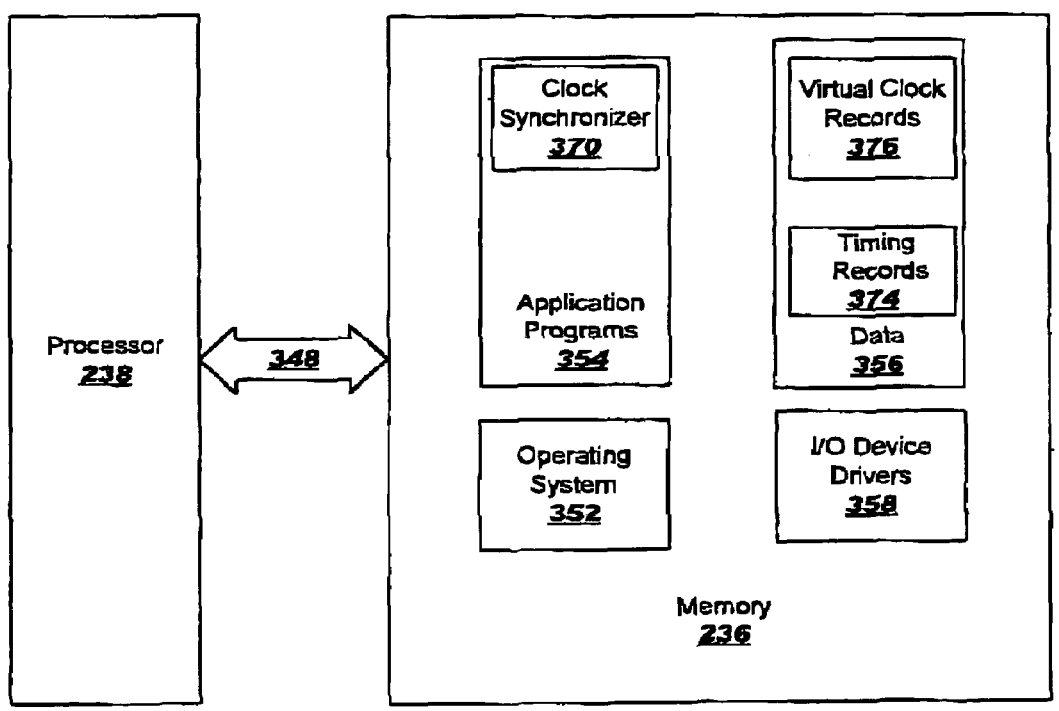
FIG. 3 is a more detailed block diagram of data processing systems implementing clock synchronization according to embodiments of the present invention.

FIG. 3 is a block diagram of embodiments of data processing systems that illustrate systems, methods, and computer program products in accordance with embodiments of the present invention. The processor 238 communicates with the memory 236 via an address/data bus 348. The processor 238 can be any commercially available or custom microprocessor. The memory 236 is representative of the overall hierarchy of memory devices containing the software and data used to implement the functionality of the data processing system 230. The memory 236 can include, but is not limited to, the following types of devices: cache, ROM, PROM, EPROM, EEPROM, flash memory, SRAM, and DRAM.

As shown in FIG. 3, the memory 236 may include several categories of software and data used in the data processing system 230: the operating system 352; the application programs 354; the input/output (I/O) device drivers 358; and the data 356. As will be appreciated by those of skill in the art, the operating system 352 may be any operating system suitable for use with a data processing system, such as Solaris from Sun Microsystems, OS/2, AIX or System 390 from International Business Machines Corporation, Armonk, N.Y., Windows 95, Windows 98, Windows NT, Windows ME or Windows 2000 from Microsoft Corporation, Redmond, Wash., Unix or Linux. The I/O device drivers 358 typically include software routines accessed through the operating system 352 by the application programs 354 to communicate with devices such as the input devices 232, the display 234, the speaker 244, the microphone 245, the I/O data port(s) 246, and certain memory 236 components. The application programs 354 are illustrative of the programs that implement the various features of the data processing system 230 and preferably include at least one application which supports operations according to embodiments of the present invention. Finally, the data 356 represents the static and dynamic data used by the application programs 354, the operating system 352, the I/O device drivers 358, and other software programs that may reside in the memory 236.

As is further seen in FIG. 3, the application programs 354 in an endpoint node device may include a clock synchronization module 370 that transmits a clock request to initiate execution of a clock synchronization protocol to a single endpoint node or a plurality of endpoint nodes connected to a network. The clock request may be transmitted through the I/O data ports 246 which provide a means for transmitting the clock request and also provide a receiver that receives, for example, over the network 12 obtained responses from the endpoint node or nodes based on the initiated clock synchronization protocol. Thus, in various embodiments of the present invention, the clock request to initiate the clock synchronization protocol as well as the corresponding responses may be communicated between pairs of endpoint node devices on the network. It will be understood that the console node shown in FIG. 1 may act as an endpoint node.

Additional aspects of the data 356 in accordance with embodiments of the present invention are also illustrated in FIG. 3. As shown in FIG. 3, the data 356 included in an endpoint node device may include timing records 374 containing stored measurement values. In various embodiments, the stored measurement values may be stored, for example, as a one-way delay measurement or as individual time of transmission of a clock request and/or receipt time of a corresponding response to a clock request for particular ones of the clock requests transmitted during an executed clock synchronization protocol. The data may also be stored in a more processed form, such as time difference records or averaged or otherwise processed records, for a plurality of transmitted clock request packets and/or between a plurality of different endpoint nodes. Furthermore, the data may be processed further to generate the one-way delay measurements or other measurements, such as frequency bias. The timing records 374 may contain information related to a single other endpoint node connected to the network or a plurality of different endpoint nodes connected to the network. Additional information may also be included, such as a last update time, so that the age of the respective clock synchronization information for particular ones of a plurality of candidate endpoint nodes may be tracked and updated at a selected interval or based on a selected event.

Virtual clock records 376 are also provided in the data 356 as shown in the embodiments of FIG. 3. The virtual clock records 376 may contain one or more values of a virtual node clock corresponding to one or more endpoint nodes, each virtual clock corresponding to a single endpoint. For example, a virtual clock record at a first node (node A) may contain a virtual clock value for a second node clock (virtual node B clock). Furthermore, node A's virtual clock record may also contain a virtual clock value for a third node clock (virtual node C Clock) and so on. The values of the virtual clocks at a given time may be generated based on the information contained in the timing records 374 and virtual clock records 376. For example, a value of a virtual node clock may be generated based on the one way delay and the individual time of transmission of a clock request and time of reception of a corresponding response to the clock request. Thus, the clock synchronization module 370 in the embodiments of FIG. 3 may be configured to establish a virtual clock value based on one-way delay measurements that are based on obtained timing information from clock request packets transmitted and corresponding responses received during an executed clock synchronization protocol.

It will be understood by those having skill in the art that although the timing records 374 and virtual clock records 376 are described above as two separate records, the present invention should not be limited to this configuration. For example, the timing records 374 and the virtual clock records 376 may be combined into a single record or alternatively split into three or more records. Furthermore, the contents of these records should not be limited to the information set out above.

While the present invention is illustrated, for example, with reference to the clock synchronization module 370 being an application program in FIG. 3, as will be appreciated by those of skill in the art, other configurations may also be utilized while still benefiting from the teachings of the present invention. For example, the clock synchronization module 370 may also be incorporated into the operating system 352 or other such logical division of the data processing system 230. Thus, the present invention should not be construed as limited to the configuration of FIG. 3 but is intended to encompass any configuration capable of carrying out the operations described herein. Alternatively, the clock synchronization module may be included in devices such as routers to synchronize clocks at endpoints in relation to one-way traffic.

Now referring to FIG. 4, a block diagram of an endpoint node 400 equipped with the clock synchronization module 370 according to further embodiments of the present invention will be described. As discussed above, each endpoint node may be equipped with the clock synchronization module 370 shown in FIG. 4, thus the clock synchronization module 370 shown in FIG. 4 may represent the clock synchronization module at both the first endpoint node (node A) and the second endpoint node (node B) referred to in the following discussion of the present invention. It will be understood that the endpoint nodes may include a Global Positioning System (GPS) clock. Endpoint nodes including a GPS clock may use the synchronization module of the present invention to synchronize the GPS clock located in the endpoint to the actual GPS time. It will be further understood that each endpoint containing a GPS would be equipped with GPS driver software capable of supporting this synchronization.

A clock request may be sent from node A to node B. This clock request may include a transmission time of the request from node A to node B that may be stored in a timing record that may be stored in the timing records 374 portion of the data 356. A corresponding response may be sent from node B back to node A and the response may contain the timing record. This timing record may further include, but is not limited to, a reception time of the clock request at node B and/or a transmission time of the response from node B to node A. A virtual clock circuit 410 may be configured to establish an initial value of a virtual node B clock (VBC), i.e. a reference clock, at node A based on node A's clock and the timing record received from node B based on node B's clock. The value of VBC may be stored in the virtual clock records 376 portion of the data 356. Although FIG. 4 is described with respect to nodes A and B, embodiments of the present invention should not be limited to this configuration. For example, node A may also exchange clock requests and corresponding responses with a third node (node C). If this were the case, node A would maintain a virtual node C clock (VCC), a value of which may also be stored in the virtual clock records 376 portion of the data 356 along with VBC. Additional virtual clocks for further endpoint nodes may be similarly maintained, however, operations of all such virtual clocks will be described further with reference to only A and B to simplify the description provided herein.

The virtual clock circuit 410 may be configured to establish an initial value of VBC based on a one way delay between node A and node B. The one way delay may be calculated based on a time the clock request was transmitted from node A to node B and a time a corresponding response is received from node B at node A. In other words, the one way delay is based on the round trip delay between node A and node B, assuming processing time for the clock request at node B is zero and the delay symmetrical. The round trip delay may be calculated by determining the difference between the time the clock request was transmitted from node A to node B and the time the corresponding response is received from node B at node A. For example, the round trip delay (RTD) may be calculated using the following equation:

$$RTD = \text{Reception time of corresponding response from node } B - \text{Transmission time of the request from node } A. \quad (1)$$

The one way delay is assumed to be half the round trip delay. For example, the one way delay (OWD) may be calculated using the following equation:

$$OWD = \tfrac{1}{2} RTD \quad (2)$$

where RTD is calculated using equation (1). It is understood that this approach to calculating the one way delay assumes that the transmission time from node A to node B is equivalent to the transmission time from node B to node A and that other approaches may be used in keeping with the present invention. For example, instead of assuming a processing time of zero at node B, a response from node B could include both the reception time of the clock request at node B and the transmit time of the corresponding response from node B. These values could be used to calculate the processing time at node B which could then be used to calculate the round trip delay. For example, the processing time at node B may be calculated using the following equation:

Processing time at node $B$=Transmission time of response from node $B$ to node $A$−Reception time of the clock request at node $B$ from node $A$ (3)

where the transmission time from node B and the reception time at node B are received in a timing record included in a response from node B. Thus, RTD may be calculated adjusting for the processing time at node B according to the following equation:

RTD=(Reception time of corresponding response from node $B$−Transmission time of the request from node $A$)−Processing time at node $B$ (4)

where the processing time at node B is calculated using equation (3). Accordingly, VBC may be calculated using the following equation:

VBC=½RTD+Transmission time of response from node $B$ (5)

where RTD may be calculated using either equation (1) or (4) set out above, ½ RTD is the one way delay, and the transmission time of response is included in a timing record included in the response from node B. The virtual clock circuit 410 may be further configured to update the value of VBC based on subsequent responses received from node B, for example, using equation (5) set out above.

Once the initial value of VBC is determined, a frequency bias circuit 420 may be configured to determine a frequency bias adjustment factor for the VBC based on time spaced ones of the plurality of clock requests from node A and the plurality of corresponding responses from node B. A frequency bias is an estimate of a drift rate between node A's clock and node B's clock between request/response events so as to adjust the value of VBC between such events. The frequency bias may be calculated along with a corresponding confidence interval. A desired confidence interval such as a 95 percent confidence interval, may be specified for the calculated frequency bias before it is used to adjust values for VBC.

The frequency bias may be determined based on the rate of change of node A's clock relative to the rate of change of VBC. For example, the frequency bias (FB) may be represented by the following equation:

FB=(node $A$ Clock at time $N$−node $A$ Clock at time 0)/(a time of $VBC$ at time $N$−$VBC$ at time 0) (6)

where time N is the time of the current request/response event and time 0 is a time of a preceding request/response event. The calculated frequency bias and confidence interval may be compared to an acceptance criteria or desired confidence interval. This comparison may be used to determine how often the clocks at node A and node B should be resynchronized by a request/response event so as to reduce network traffic associated with clock synchronization and provide a smoother clock.

An example of calculating the frequency bias given two clock samples will now be discussed. Given two samples, the frequency bias may be represented by the following equation:

$FB=[(X_2-D_2)-(X_1-D_1)]/(N-L)$ (7)

where $X_1$ and $X_2$ are the reception times of the request at node B for the first and second samples, respectively, $D_1$ and $D_2$ are the one way delays from node A to node B for the first and second samples, respectively, and L and N are the times of transmission of a request from node A to node B with respect to the first and second samples, respectively. Furthermore, assuming that the one way delays $D_1$ and $D_2$ are approximately equal, the frequency bias may be represented by the following equation:

$FB=(X_2-X_1)/(N-L)$ (8)

where $X_1$ and $X_2$ are the reception times of the request at node B for the first and second samples, respectively, and L and N are the times of transmission of a request from node A to node B with respect to the first and second samples, respectively. Alternatively, the frequency bias may be represented by the following equation:

$FB=(Y_2-Y_1)/(P-M)$ (9)

where $Y_1$ and $Y_2$ are the transmission times of the response from node B for the first and second samples, respectively, and M and P are the reception times of a response from node B at node A with respect to the first and second samples, respectively.

Furthermore, the results of equations (8) and (9) may be averaged and may provide a more accurate result. The accuracy of the results typically increase as the samples get further apart. For example, assuming that $Y_2-Y_1$ is approximately equal to $X_2-X_1$, the FB may be represented by the following equation:

$FB=2(Y_2-Y_1)/[(N-L)+(P-M)]$ (10)

where $Y_1$ and $Y_2$ are the transmission times of the response from node B for the first and second samples, respectively, L and N are the times of transmission of a request from node A to node B with respect to the first and second samples, respectively, and M and P are the reception times of a response from node B at node A with respect to the first and second samples, respectively. Frequency bias will be further discussed below with respect to FIG. 6.

Once a frequency bias is calculated that satisfies the acceptance criteria discussed above, the frequency bias may be used to provide a value of the VBC at various times in response to a request for node B's clock value. For example, a time of VBC at a time X may be represented by the following equation:

$VBC$ at a time $X$=$VBC$ at a time 0+$\Delta t(FB)$+base offset (11)

where time X is the current time of the request for node B's clock, time 0 is a time of a preceding request/response event, $\Delta t$ is the change in node A's clock from time 0 to time X, and the base offset is the difference between a time of VBC at time 0 and node A's clock at time 0. Further details of the base offset calculation are discussed below. The VBC calculated with equation (11) may be used as the new reference clock. For example, $\Delta t$ may be represented by the following equation:

$\Delta t$=node $A$'s clock at time $X$−node $A$'s clock at time 0 (12)

A provider circuit 430 may be configured to provide a time of VBC, calculated using equation (11) above, based on the frequency bias adjustment factor responsive to requests for node B's clock at a time between ones of the plurality of clock requests, i.e. a time between resynchronization of the clocks by a request/response event. It will be understood that a frequency bias that satisfies the acceptance criteria may, depending on various network conditions, not be obtained. The frequency bias may not be used (or may be set equal to one in various embodiments such as shown in equation (11)) in this situation.

The jitter calculation circuit 411 may be configured to establish an updated initial value of VBC at node A based on node A's clock and a timing record received from node B based on node B's clock responsive to a clock request from node A to node B. Using this updated initial value of VBC and a calculated value of VBC, a jitter may be determined. For example, the jitter may be represented by the following equation:

$$\text{Jitter} = \text{Updated } VBC - \text{Calculated } VBC \qquad (13)$$

where the calculated VBC is calculated, for example, using equation (11) above or other suitable formula. The jitter represents the deviation of VBC from the actual node B clock from one resynchronization period to another resynchronization period. The jitter may be used to determine the length of time between clock synchronization periods. In other words, the length of time between clock resynchronization periods may be adaptively determined based on the jitter, such as increasing the length of time between clock synchronization periods if the jitter, for example, of equation (13), is below a first value and decreasing time if the jitter of equation (13) is above a second value.

The skew calculation circuit 413 may be configured to use the jitter to determine a skew rate (SR) for the updated initial value of VBC. For example, the skew rate may be determined using the following equation:

$$SR = \text{Jitter}/\text{time since last resynchronization period} \qquad (14)$$

where the jitter may be calculated using equation (13) above and the time since the last resynchronization period may be calculated using equation (12) above. A clock adjustment circuit 414 may determine if the skew rate satisfies a predetermined acceptance criteria, such as the confidence interval used to accept and/or reject the calculated frequency bias. If the skew rate satisfies the predetermined acceptance criteria, a long polling mode may be entered and the skew rate may be used as a phase adjustment. If, on the other hand, the skew rate does not satisfy the predetermined acceptance criteria, a short polling mode may be entered. Each polling mode has an associated resynchronization period. The resynchronization period of the long polling mode is longer than the resynchronization period of the short polling mode. The length of time between these resynchronization periods, as discussed above, may be determined based on the jitter regardless of which polling mode is entered.

The error calculation circuit 415 may be configured to determine an estimated error and a maximum error, both of which may be reported to a user of the network for informative purposes. The estimated error may be based on the absolute value of the skew rate calculated using equation (14) above and the time until the next resynchronization period, i.e. the difference between the current time and the time scheduled for the next request. The maximum error may be determined based on the one way delay (OWD) and the estimated error. For example, the maximum error may be determined using the following equation:

$$\text{Max Error} = OWD + \text{Estimated Error} \qquad (15)$$

where OWD is calculated using equation (2) set out above.

Figure 4:
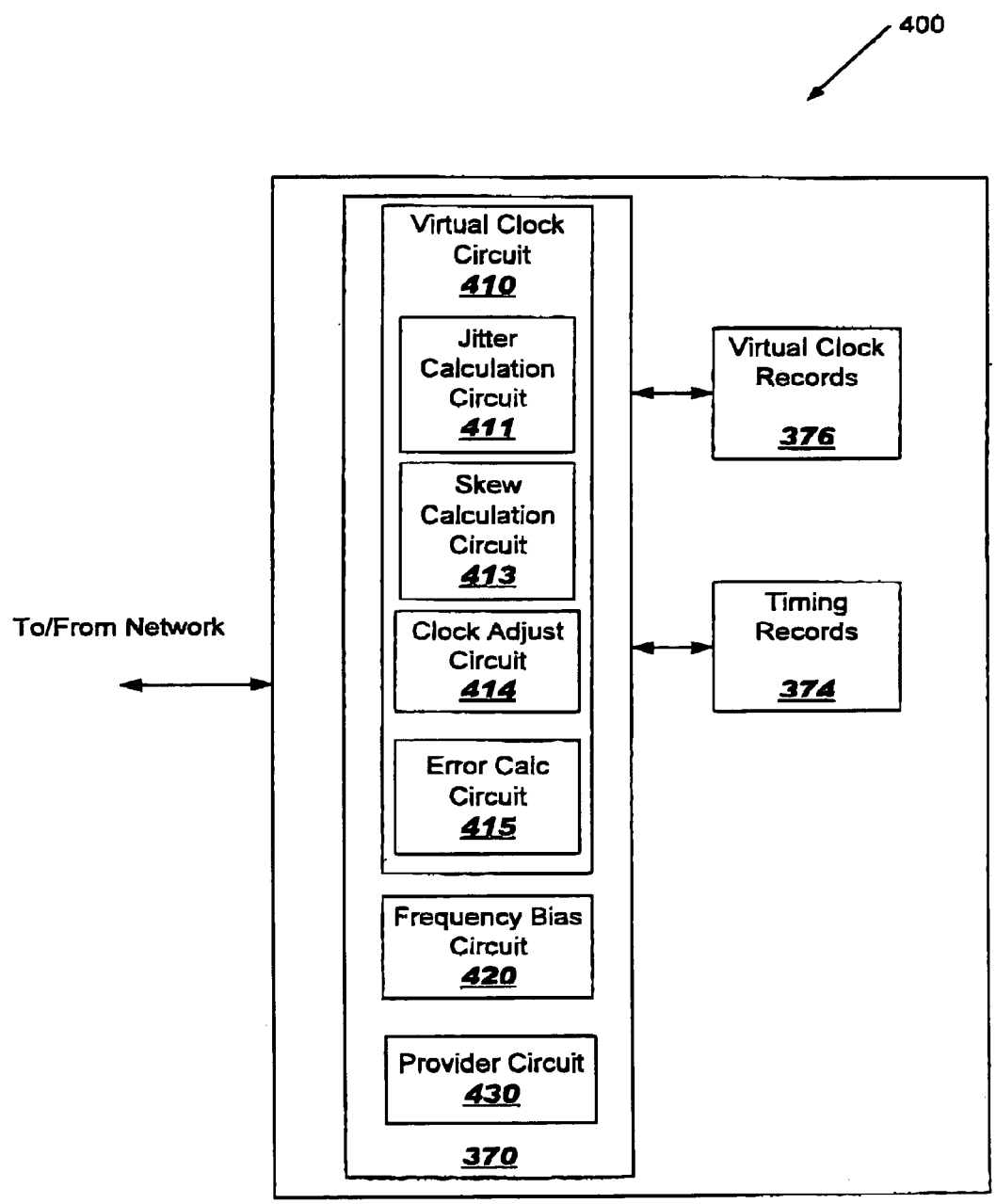
FIG. 4 is a block diagram of an endpoint node equipped with the clock synchronization module according to embodiments of the present invention.

It will be understood that although the jitter calculation circuit 411, the skew calculation circuit 413, the clock adjustment circuit 414 and the error calculation circuit 415 are shown as part of the virtual clock circuit 410 in FIG. 4, embodiments of the present invention are not limited to this configuration. For example, these circuits may be stand alone circuits included in the clock synchronization module 370. Alternatively, these circuit may be incorporated into one of the other circuits in the clock synchronization module 370.

The present invention, therefore, may provide a clock synchronization module having the capability of synchronizing operations of two or more nodes of a computer network. The present invention may provide an advantage over the prior art clock synchronization methods in that the present invention does not require special equipment associated with universal clocks, such as the stratum 1 clock of NTP, which may be directly attached to one more network nodes and may not be desirable for certain types of applications. Furthermore, the present invention focuses on synchronizing operations with respect to pairs of endpoint nodes, thus, each virtual clock may be established and maintained by communications with a single other endpoint node.

Figure 5:
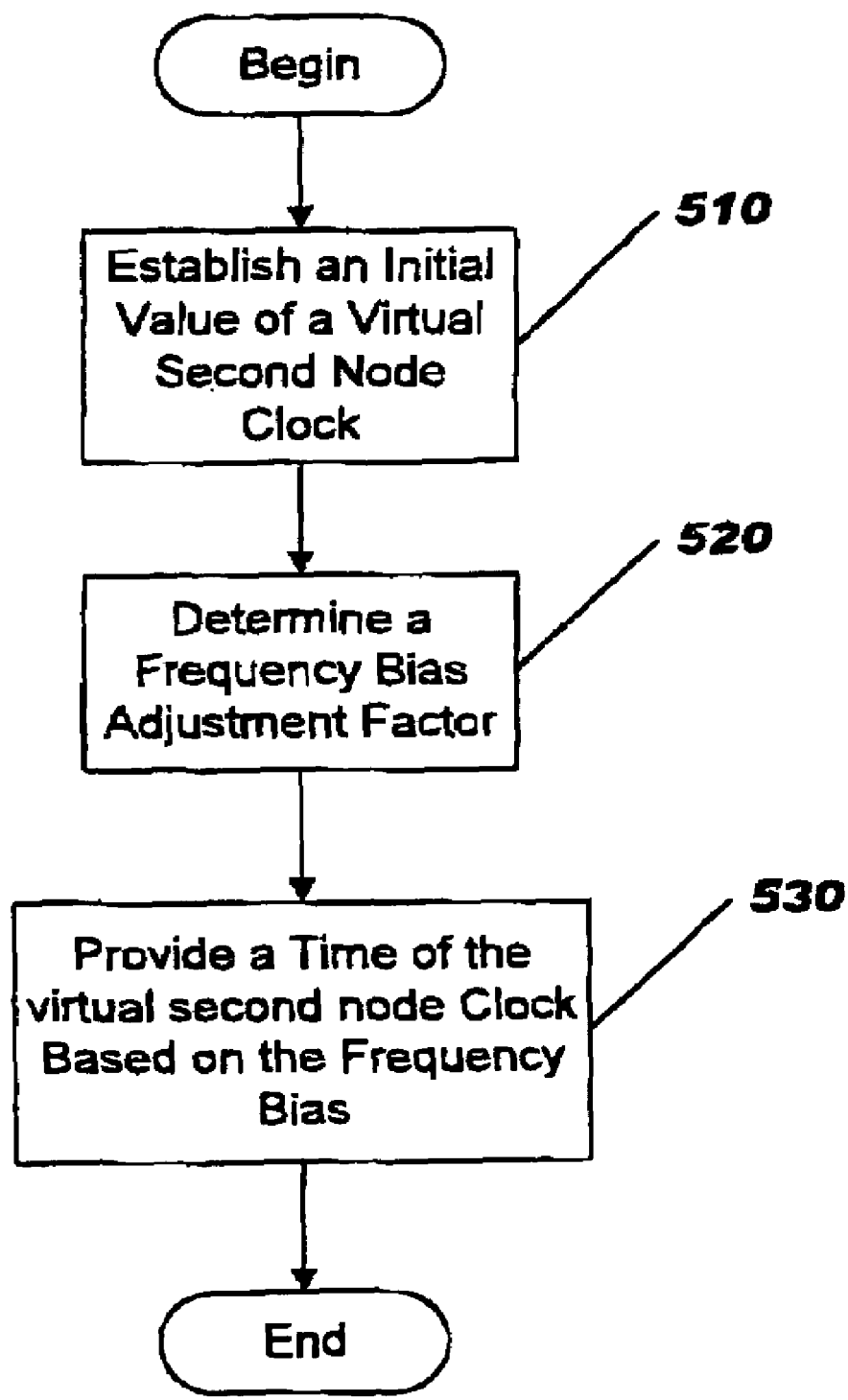
FIG. 5 is a flow chart illustrating operations for synchronizing clocks in a network according to embodiments of the present invention.

Referring now to the flowchart diagram of FIG. 5, operations for synchronizing clocks in a computer network will be further described for various embodiments of the present invention. Although the following discussion is based on an embodiment of the present invention involving only two nodes, a first endpoint node (node A) and a second endpoint node (node B), it will be understood that the present invention is not limited to this configuration. It will be understood that the present invention may be applied to a plurality of nodes making up a plurality of endpoint pairs. For example, a node A may be synchronized with a node B and a third node, node C and so on. The first pair of nodes consisting of node A and node B and the second pair of nodes consisting of node A and node C.

As shown in FIG. 5, operations begin at block 510 by establishing an initial value of a virtual node B clock (VBC) at the node A. This initial value may be established based on node A's clock and a timing record received from node B based on node B's clock. The timing record may include such information as the time a clock request was received at node B and/or the time the corresponding response to the clock request was transmitted from node B to node A. The initial value of VBC may be established based on one way delay (OWD), for example, calculated using equation (2) set out above. Thus, VBC may be determined using equation (5) set out above. The time that has elapsed at node A based on node A's clock since the reception of the response containing the time of transmission of the response from node B may also be added into the VBC calculation as, in practice, the calculation of VBC may not occur instantaneously upon receipt of the response from node B.

Once the initial value of VBC is established (block 510), a frequency bias adjustment factor may be determined (block 520). This frequency bias adjustment may be determined based on a plurality of clock requests from node A to node B and a plurality of corresponding responses from node B to node A. The frequency bias adjustment factor may be calculated using equation (6) above. The corresponding responses from node B may include a timing record based on node B's clock. Once the frequency bias adjustment factor is determined, the first node may provide a time of VBC based on the frequency bias adjustment factor (block 530) in response to a request for node B's clock at a time between resynchronization periods. In other words, node A may receive a request for node B's clock and node A may respond with a determination of VBC at that instant. VBC at that particular instant between resynchronization periods, i.e. between request/response events, may be calculated using the determined frequency bias adjustment factor, for example, VBC at that particular instant may be calculated using equation (11) set out above.

Figure 6A:
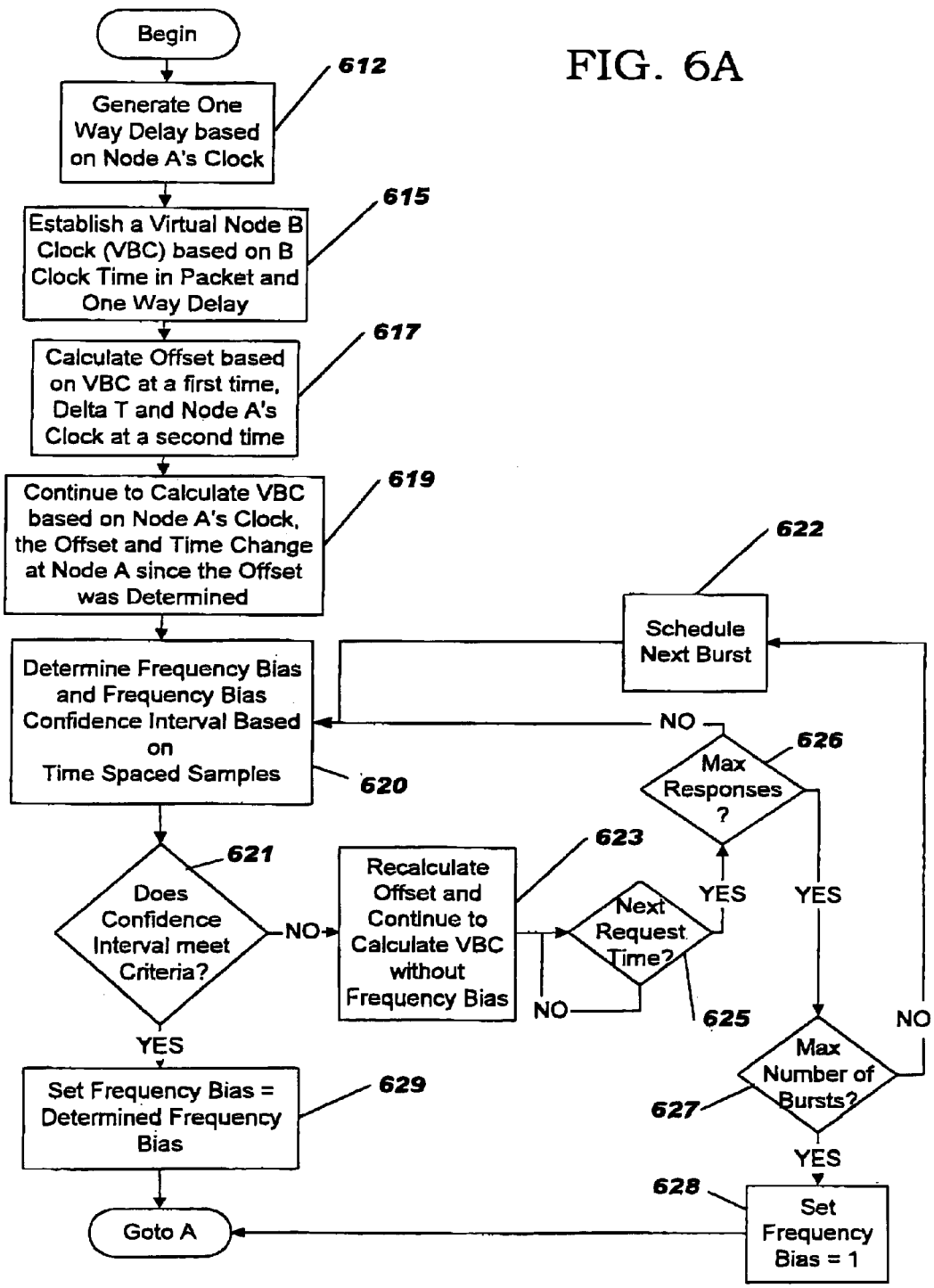
FIG. 6A is a more detailed flow chart illustrating operations for synchronizing clocks in a network according to embodiments of the present invention.

Referring now to the flowchart diagram of FIG. 6A, operations for synchronizing clocks in a computer network will be further described for various embodiments of the present invention. Operations begin at block 612 by generating a one way delay based on a clock at a first node (node A). The one way delay may be calculated based on the transmission time of a clock request from node A to a second node (node B) and the reception time of a corresponding response from node B to node A. It will be understood that this calculation may assume that the transmission time from node A to node B is roughly the same as the transmission time from node B to node A. This calculation further may assume that the processing time for the clock request at node B is zero. Based on these assumptions, one way delay (OWD) may be calculated using equation (2) set out above. Alternatively, equation (2) may be modified to include an assumed non-zero processing time at node B. For example, one way delay may be calculated using the following equation:

$$OWD = \frac{1}{2}[(RTD) - \text{assumed processing time}] \quad (16)$$

where RTD is calculated using equation (1) set out above.

Alternatively, the reception time of the clock request at node B and the transmission time of the corresponding response from node B may be included in the calculation. These additional measurements may allow the processing time at node B to be calculated and, thus, the processing time at node B need not be assumed to be zero (or otherwise known). The processing time at node B in this alternative calculation is equivalent to the difference between the reception time of the clock request at node B and the transmission time of the corresponding response from node B as illustrated by equation (4) above.

Once the one way delay is calculated (block 612), an initial value for the virtual node B clock (VBC), i.e. a reference clock, may be established at node A (block 615). When calculating the initial value for the VBC, an initial n clock requests, for example, three, may be transmitted from node A to node B at, for example, 10 ms intervals (to increase the likelihood of at least one successful request/response event) and the initial value of the VBC may be calculated using a response to a clock request received at node A, such as a most recent response. Note that, due to the dynamic nature of networks, packets may periodically get lost, but the probability that all n clock requests/responses would get lost is very low. The initial value for VBC may be established based on the determined one way delay and the time of transmission of the response from node B included in a timing record received in the corresponding response to the clock request from node B. Thus, VBC may be the one way delay added to the time of transmission of the response from node B, and optionally, some processing time at node A.

Once an initial value for VBC is established, an offset between VBC and node A's clock may be calculated (block 617). The offset may be calculated based on the one way delay (OWD), the time of transmission of the last response from node B included in the timing record and node A's clock time when the last response was received at node A. For example, the offset may be represented by the following equation:

$$\text{Offset} = [OWD + \text{Transmission time from node } B \text{ in the last response}] - A\text{'s clock time when last response was received} \quad (17)$$

where OWD is calculated using equation (2) set out above. The offset may be used to calculate a value for VBC when a request is received at node A for node B's clock (block 619). For example, a value of VBC may be calculated based on the determined offset, node A's clock time at the time of a request and the change of time based on node A's clock since the offset was determined (Δt) as follows:

$$\text{Value of VBC at time } X = VBC \text{ at time } 0 + \text{Offset at time } 0 + \Delta t \quad (18)$$

where time X is the time of the current request/response event, time 0 is a time of a preceding request/response event when offset was determined, and Δt is the change in node A's clock from time 0 to time X.

Once the offset is determined, a frequency bias may be calculated along with the corresponding confidence interval for the determined frequency bias (block 620). After the initial burst of n clock requests has produced an initial value for VBC, additional clock requests are sent out at about 1 second intervals. The frequency bias may be determined based on the rate of change of node A's clock relative to the rate of change of VBC values. Once at least two clock responses are received at node A, the frequency bias and its corresponding confidence interval may be calculated (block 620) as discussed above. It is determined if the confidence interval satisfies a predetermined acceptance criteria (block 621). If the calculated confidence interval does not satisfy the predefined acceptance criteria, the offset is recalculated using the next response received at node A and VBC values continue to be generated without using the frequency bias (block 623). The confidence interval may be a 95 percent confidence interval. An acceptable confidence interval may be less than or equal to about $4\ e^{-6}$. The confidence interval may be calculated using a normal distribution variance or Hadamard type variance for example.

When the calculated confidence interval does not satisfy the predefined acceptance criteria, it is determined if another clock request should be sent from node A to node B (block 625). If the frequency bias calculated from the first response does not satisfy the predetermined acceptance criteria (block 621), the frequency bias may be recalculated along with the corresponding confidence interval based on subsequent clock requests transmitted at 1 second intervals (block 620). The frequency bias and corresponding confidence interval may be recalculated until a confidence interval is calculated that satisfies the acceptance criteria (block 621) or a maximum number of responses have been received at node A (block 626), i.e. a sample vector for responses is full and no more responses may be stored in the vector. Thus, if it is determined that the next request time, for example, 1 second, has arrived (block 625) and that the maximum number of responses have not been received at node A (block 626), operations return to block 620 and repeat until a confidence interval is calculated that satisfies the acceptance criteria (block 621) or it is determined that a maximum number of responses have been received at node A (block 626). If it is determined that the next request time has not arrived, operations remain at block 625 until it is determined that the next request time has arrived.

If it is determined that a maximum number of responses have been received at node A (block 626), it is determined if a maximum number of bursts have been performed (block 627). A burst may consist of the operations of blocks 620 through 626 until a frequency bias confidence interval satisfies the acceptance criteria (block 621) or the maximum number of responses have been received at node A (block 626). If it is determined that a maximum number of bursts have not been performed (block 627), the next burst is scheduled (block 622). When the scheduled time for the next burst arrives, operations return to block 620 and repeat until a frequency bias confidence interval is calculated that satisfies the acceptance criteria (block 621) or it is determined that maximum number of responses have been received at node A (block 626). The maximum number of bursts may be preset and may be, for example, three. The only difference between the first burst and any subsequent burst may be the data used in calculating the frequency bias. During the first burst, only the sample vector of responses generated during the first burst is used to calculate the frequency bias. Subsequent bursts may not only use the sample vector of responses generated during the subsequent burst but may also use the sample vector of responses from previous bursts to calculate the frequency bias. Typically, the more samples used in the calculation of frequency bias, the more likely that a frequency bias confidence interval that satisfies the acceptance criteria will be determined at block 620.

Figure 6B:
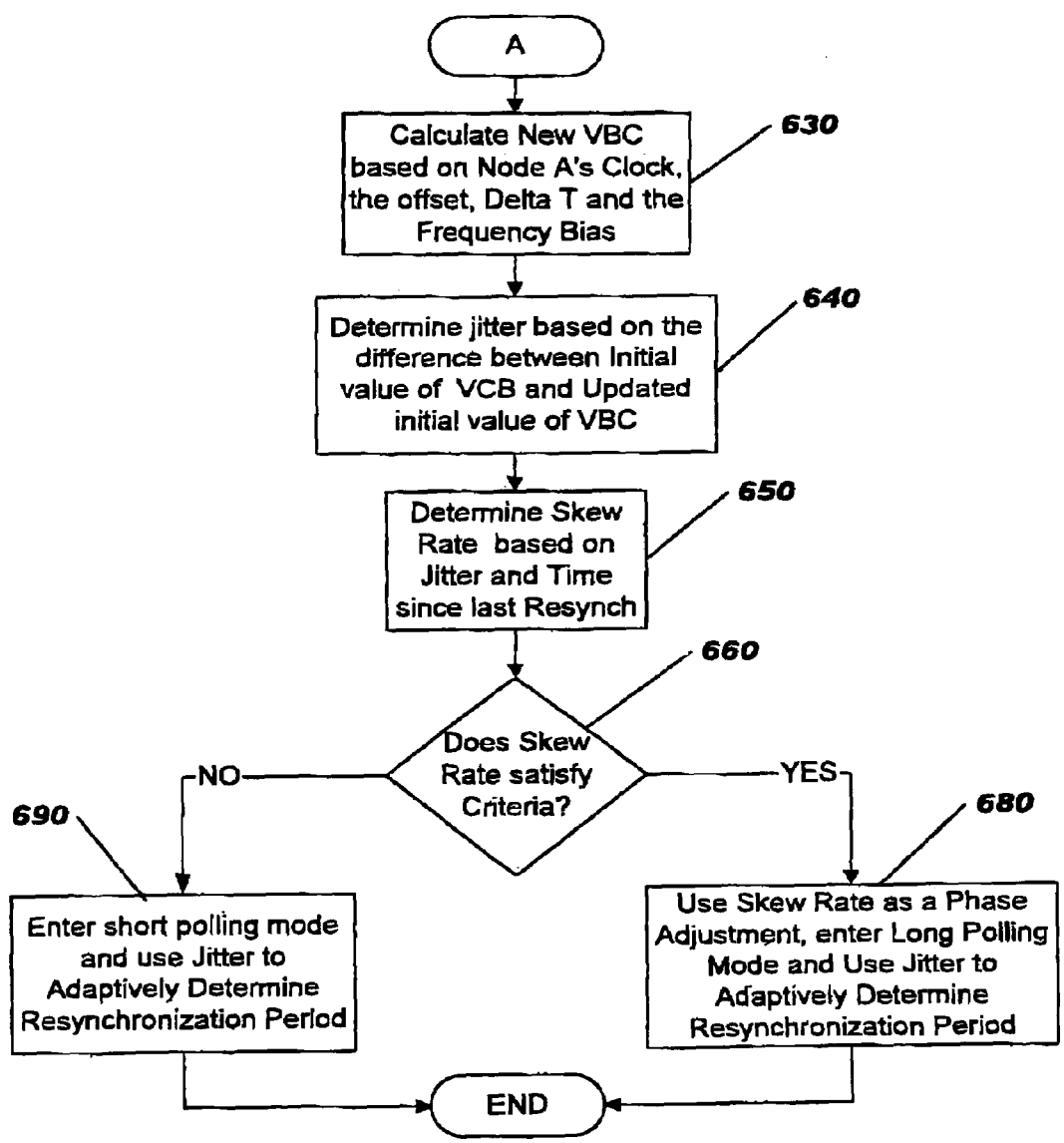
FIG. 6B is a continuation of the more detailed flow chart of FIG. 6A illustrating operations for synchronizing clocks in a network according to embodiments of the present invention.

If, on the other hand, it is determined that the maximum number of bursts has been reached (block 627), the frequency bias may not be used (or set equal to 1 in some embodiments) (block 628) and operations continue to block 630 of FIG. 6B. It will be understood that methods of narrowing in on a usable frequency bias may used when a usable frequency bias can not be calculated using the method discussed above, for example, a frequency bias may be determined based on statistical analysis based on the skew rate. If, at some point, it is determined that the calculated confidence interval satisfies the predefined acceptance criteria (block 621), the frequency bias is set to the calculated frequency bias (block 629) and operations also continue at block 630.

Now referring to FIG. 6B, regardless of whether the frequency bias was set equal to 1 or to the calculated frequency bias, an updated value for VBC may be calculated based on node A's clock, the calculated offset between node A's clock and VBC, the time change since the last clock resynchronization based on node A's clock and the determined frequency bias (block 630). For example, an updated value for VBC may be determined using the following equation:

$$\text{Value of } VBC \text{ at time } X = VBC \text{ at time } 0 + \text{Offset at time } 0 + (\Delta t * FB) \quad (19)$$

where time X is the time of the current request, time 0 is the time of the last resynchronization period (request/response event), the offset is calculated as discussed above with respect to equation (17), $\Delta t$ is the change in node A's clock from time 0 to time X, and FB is the frequency bias calculated using equation (6) set out above. This value of VBC may now be the reference clock. It will be understood that the request/response event that is used to calculate the one way delay may also used to update the clock.

A jitter, as discussed above, may be determined based on the difference between an updated initial value of VBC and a calculated value of VBC (block 640). The calculated value of VBC may be determined using equation (11) set out above. The jitter is the deviation of VBC from one resynchronization period to the next. The jitter may be calculated based on the timing record received from node B in a response to a clock request, for example, using equation (13) set out above. Once the jitter is determined (block 640), a skew rate may be determined based on the jitter and the time since the last response was received at node A based on node A's clock (block 650). For example, the skew rate may be calculated using equation (14) set out above. Thus, the skew rate (SR) is basically the jitter divided by the time since the last clock resynchronization period, i.e. last response/request event.

It is determined if the skew rate satisfies a predetermined acceptance criteria (block 660). For example, the acceptance criteria may be that the skew rate be smaller than the confidence interval used to accept the frequency bias discussed above. If the skew rate satisfies the acceptance criteria, the skew rate may be used as a phase adjustment and long polling mode may be entered (block 680). For example, the VBC may be calculated using equation (19) set out above where FB=FB+SR. It will be understood that the skew rate may be positive or negative. It will be further understood that long polling mode is typically entered when the clock synchronization module of the present invention is used for Local Area Networks (LANs). The resynchronization periods in long polling mode may be, for example, from about twenty minutes apart up to several hours apart. The length of time between resynchronization periods may be adaptively determined based on the calculated jitter at the beginning of each resynchronization period. This aspect of long polling mode will be discussed further below with respect to FIG. 7.

If it is determined that the skew rate does not satisfy the acceptance criteria discussed above (block 660), a short polling mode may be entered. It will be understood that the clock synchronization module of the present invention typically enters short polling mode when used in conjunction with WANs such as internet connections. In short polling mode, the length of time between resynchronization periods is generally significantly shorter than the length of time between long polling mode resynchronization periods. For example, the length of time between resynchronization periods in short polling mode may be between about 1 and about 5 minutes. It may also be as short as about 10 seconds or even less depending on a desired accuracy for the virtual clock. As in long polling mode, the length of time between resynchronization periods may be adaptively determined, for example, based on the calculated jitter at the beginning of each resynchronization period. This aspect of short polling mode will be further discussed below with respect to FIG. 7.

Figure 7:
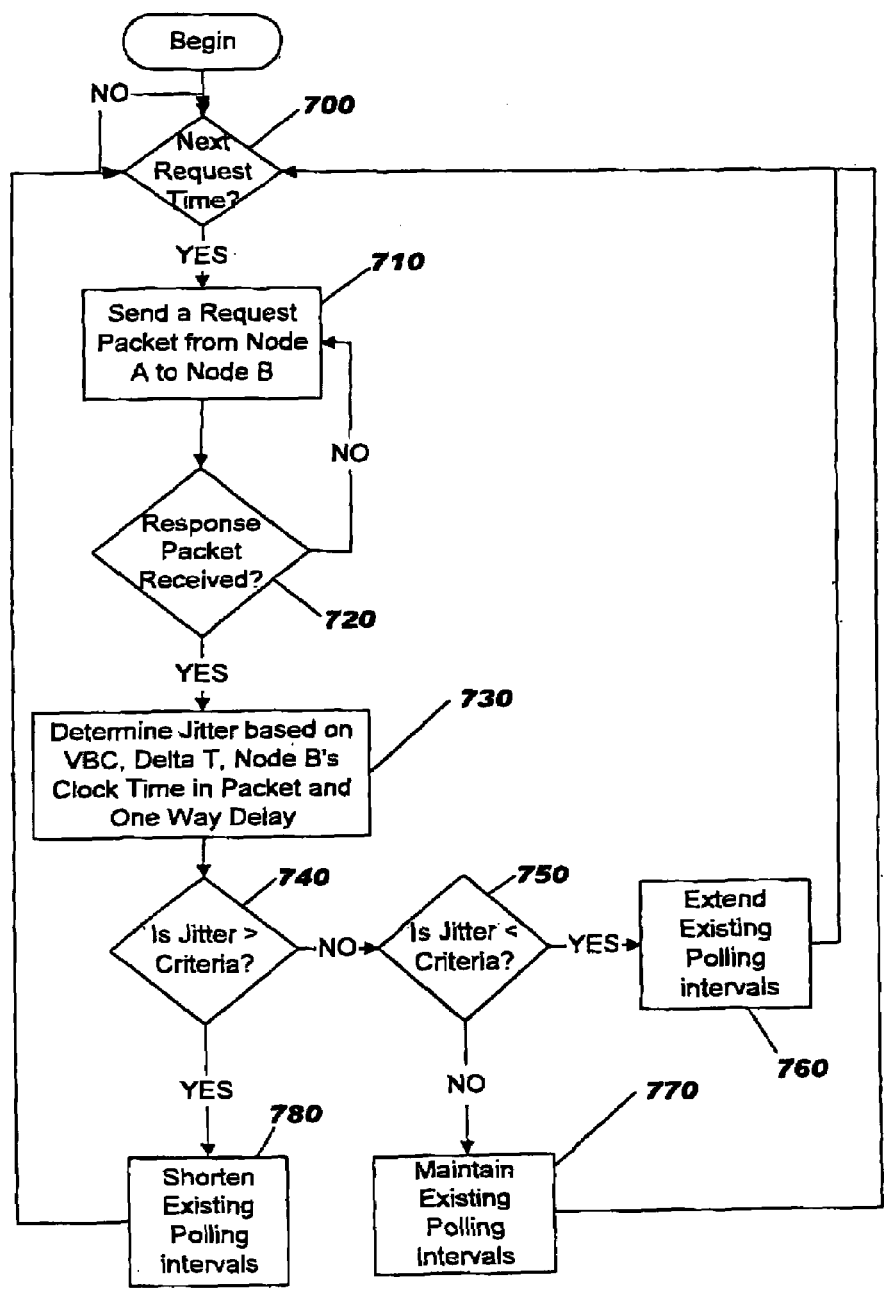
FIG. 7 is a flow chart illustrating operations related to resynchronizing clocks at different nodes of a network using adaptive polling intervals according to embodiments of the present invention.

Now referring to FIG. 7, operations related to resynchronizing clocks at different nodes of a network using adaptive polling intervals according to embodiments of the present invention will be discussed. Operations begin at block 700 by determining if a predetermined time for a resynchronization of the clocks has arrived (block 700). If it is determined that the time for resynchronization has not arrived, operations remain at block 700 until it is determined that a time for resynchronization has arrived. If, on the other hand, it is determined that the time for resynchronization of the clocks has arrived (block 700), a clock request is transmitted from node A to node B (block 710). It is then determined if a response packet has been received from node B at node A (block 720). If it is determined that a response packet has not been received (block 720), operations return to block 710 and repeat until a response packet is received. If it is determined that a response packet has been received (block 720), the jitter is determined as discussed above with respect to FIG. 6B (block 730).

It is determined if the jitter is greater than a predetermined acceptance criteria (block 740). If it is determined that the jitter is greater than a first criterion (block 740), the existing polling interval is shortened, i.e. the next resynchronization will occur sooner (block 780). If it is determined that the jitter is not greater than the second criterion (block 740), it is determined if the jitter is less than a second criterion (block 750). If it is determined that the jitter is not less than the second criterion (block 750), the existing polling interval remains unchanged (block 770). If it is determined that the jitter is less than the second criterion (block 740), then the existing polling interval is lengthened, i.e. the next resynchronization will occur later (block 760). Preferably, the second criterion is different from the first criterion so that a hysteresis will be provided over a range where a polling period will not be changed.

For example, if the minimum jitter is exceeded, the current polling interval may be divided by 1.5. If the jitter falls below the maximum jitter, the current polling may be multiplied by 1.5. The polling interval typically starts at the minimum which may be selected based on the quality of the determined frequency bias. Accordingly, when a usable frequency bias has been calculated as discussed above, the minimum clock jitter may be about 1000 µs and the maximum clock jitter may be about 500 µs. If the usable frequency bias is a good frequency bias, i.e. a confidence interval of less than or equal to $4\ e^{-6}$, the polling interval may be from about 4 minutes to about 4 hours. If the usable frequency bias is a marginal frequency bias, i.e. a confidence interval of less than $1\ e^{-5}$ but greater than $4\ e^{-6}$, the polling interval may be from about 1 minute to about 5 minutes. When a usable frequency bias has not been calculated, the minimum clock jitter may be about 15000 µs and the maximum clock jitter may be about 5000 µs. In this situation, the polling interval may be from about 10 seconds to about 5 minutes. It will be understood that these values are exemplary and the present invention should not be limited to these ranges.

It will be further understood that, at some point, the established virtual clock may expire. This may be due to the expiration of some sort of timer, for example, the virtual clock may expire after a period of not being used for a period of time. This period of time may be, for example, eight hours in long polling mode or one hour in short polling mode. When the virtual clock expires the operations discussed above may cease.

Figure 8:
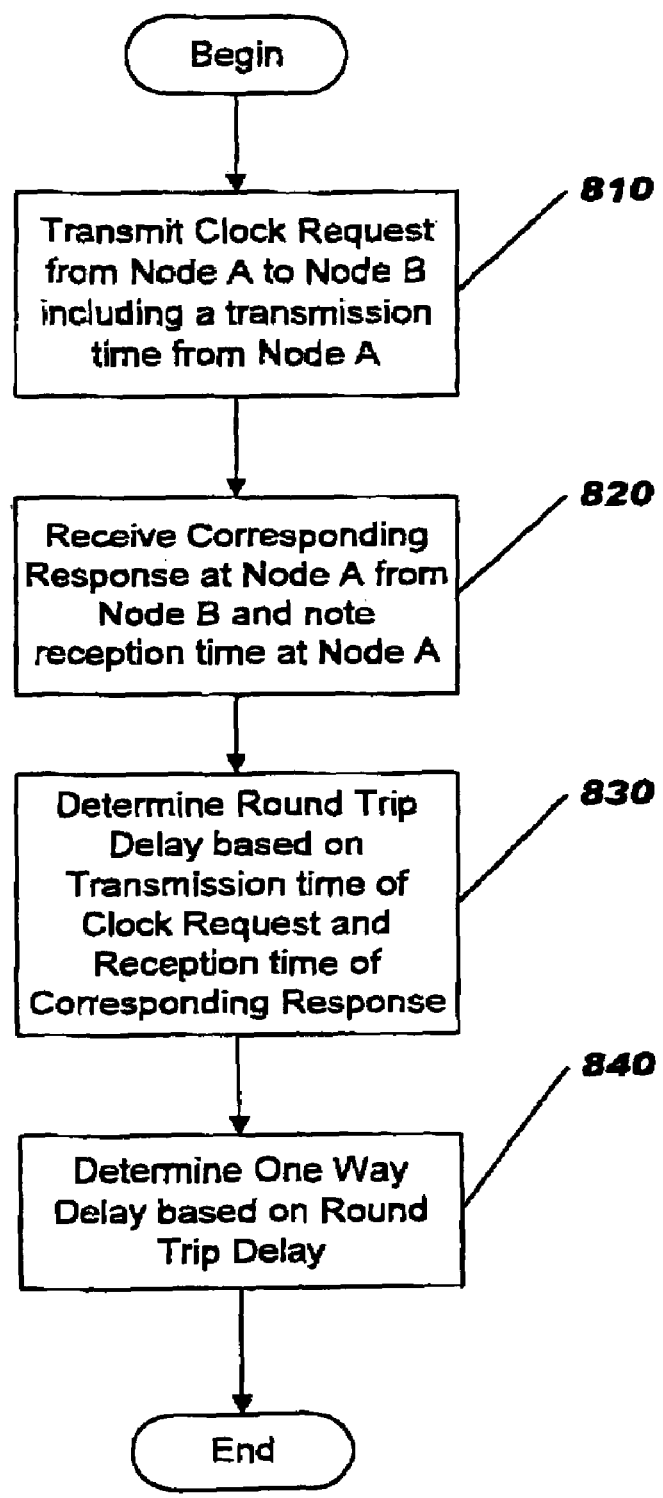
FIG. 8 is a flow chart illustrating operations for generating a one-way delay according to embodiments of the present invention.

Now referring to FIG. 8, a flow chart illustrating operations for generating a one way delay according to embodiments of the present invention will be discussed. Operations begin at block 810 by transmitting a clock request from node A to node B. The clock request may include a transmission time of the clock request from node A. Once node B receives the clock request, it may return a response to the clock request including a timing record. The timing record may include the time the clock request was received at node B and/or the time the response was transmitted from node B. The timing record may further include the time the request was transmitted from node A to node B. The transmission time from node A to node B may then be used to associate a request with its corresponding response. The response is received at node A and the reception time of the response at node A is noted (block 820). For example, the reception time may be stored in the timing records 374 along with the information discussed above with respect to node B's clock.

Once a response has been received at node A, the round trip delay is calculated based on the transmission time of the clock request from node A and the reception time of the response at node A (block 830). Thus, the round trip delay may be calculated as the difference between the time the response was received at node A and the time the response was transmitted from node A. Once the round trip delay (RTD) is determined, the one way delay may be calculated based on the RTD (block 840). Thus, the one way delay may be calculated as the round trip delay divided by two (RTD/2). This method of calculating one way delay essentially assumes that the transmission time from node A to node B is the same as the transmission time from node B back to node A and that the processing time for the clock request at node B is zero.

Alternatively, the round trip delay may be calculated using the additional information provided in a timing record, i.e. the transmission time from node B and the reception time of the clock request at node B. This calculation would be similar to the one above, except once RTD was determined, the difference between the transmission time of the response from node B and the reception time of the clock request at node B could be subtracted out of RTD. In other words, the processing time for the clock request at node B could be subtracted out of the RTD calculation above. Using this alternative, the processing time at node B would no longer be assumed to be zero (or fixed). The one way delay may still be calculated as half the calculated round trip delay. Further approaches to arriving at one way delay will be understood by those of skill in the art in light of the description of the present invention herein.

Figure 9:
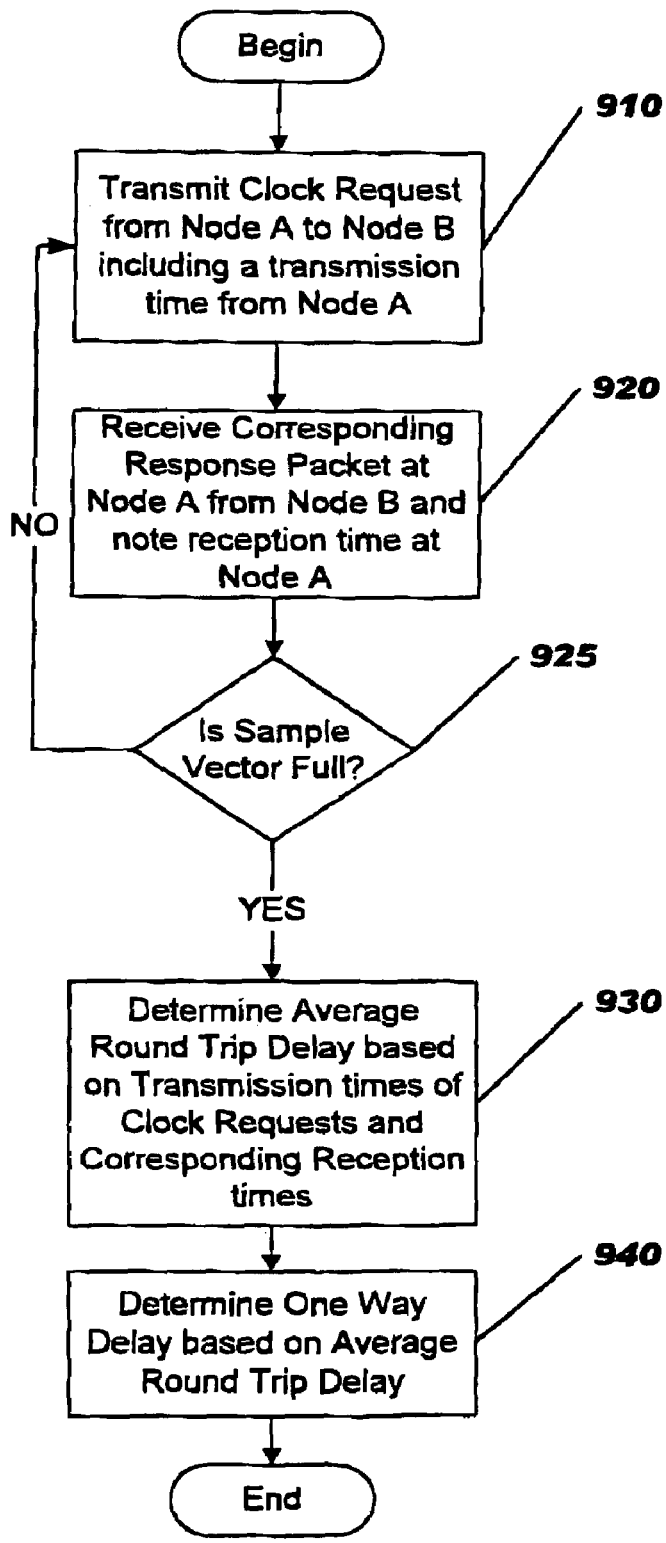
FIG. 9 is a flow chart illustrating operations for generating a one-way delay based on a plurality of samples according to embodiments of the present invention.

Now referring to FIG. 9, a flow chart illustrating operations for generating a one way delay according to alternative embodiments of the present invention will be discussed. Operations begin at block 910 by transmitting a clock request from node A to node B. The clock request may include a transmission time that the clock request was transmitted from node A. Once node B receives the clock request, it may return a response to the clock request including a timing record. The timing record may include the time the clock request was received at node B and the time the response was transmitted from node B. The timing record may further include the time the request was transmitted from node A to node B. This transmission time may then be used to associate a request with its corresponding response. The response is received at node A and the reception time of the response at node A is noted (block 920). For example, the reception time may be stored in the timing records 374 along with the information based on node B's clock discussed above.

It is then determined if a sample vector for responses is full, i.e. has the maximum number of responses been received from node B (block 925). If it is determined that the sample vector is not full, operations return to block 910 and repeat until the sample vector is determined to be full. If it is determined that the sample vector is full (block 925), the average round trip delay for all clock request/response pairs is calculated based on the plurality of transmission times of the clock requests from node A and the corresponding plurality of reception times of the responses at node A (block 930). Once the average round trip delay (ARTD) is determined, the one way delay may be calculated based on the ARTD (block 940). Thus, the one way delay may be calculated as the average round trip delay divided by two (ARTD/2). This method of calculating round trip delay generally assumes that the packets on average spend the same amount of time traveling from node A to node B as they do traveling from node B to node A. It also assumes that the processing time of the clock request at node B is zero (or some fixed value factored into the calculation to reduce the ARTD value. As discussed above, the round trip delay may also be calculated by subtracting out the actual processing time at node B. It will be understood that the average round trip delay (ARTD) may be calculated and not used in the calculation of the one way delay. For example, ARTD may be calculated and reported to the user as a statistic.

Figure 10:
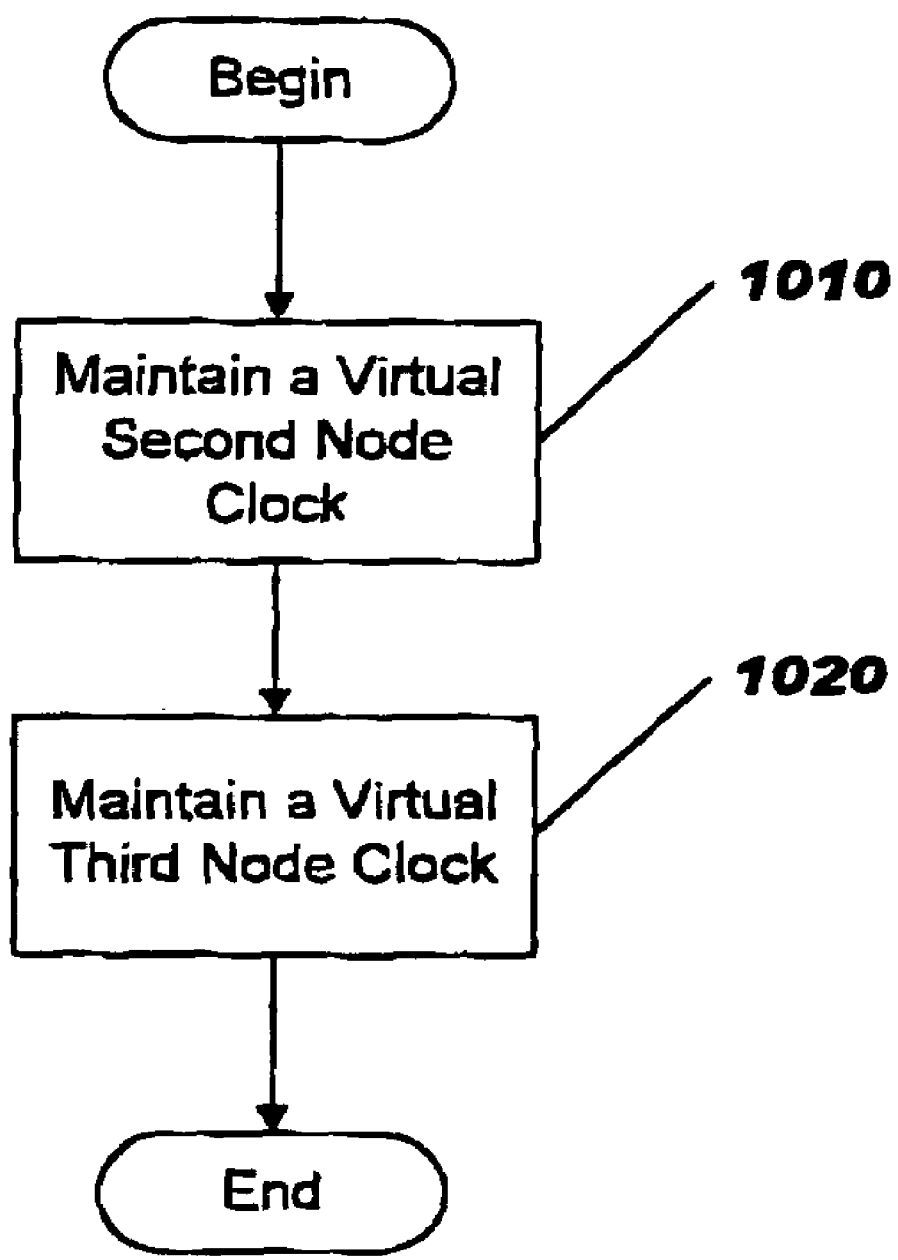
FIG. 10 is a flow chart illustrating operations for synchronizing clocks in a network according to embodiments of the present invention.
Figure 11:
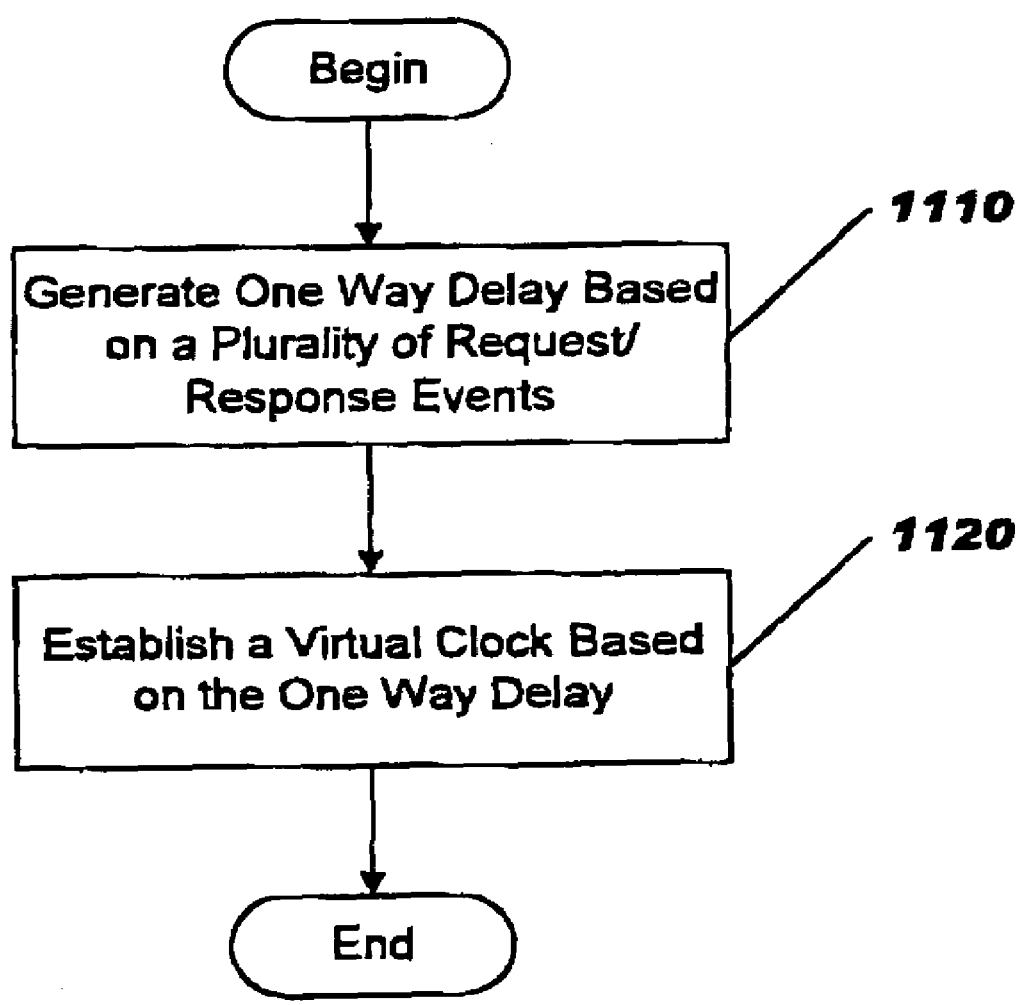
FIG. 11 is a flow chart illustrating operations for synchronizing clocks in a network according to embodiments of the present invention.
Figure 12:
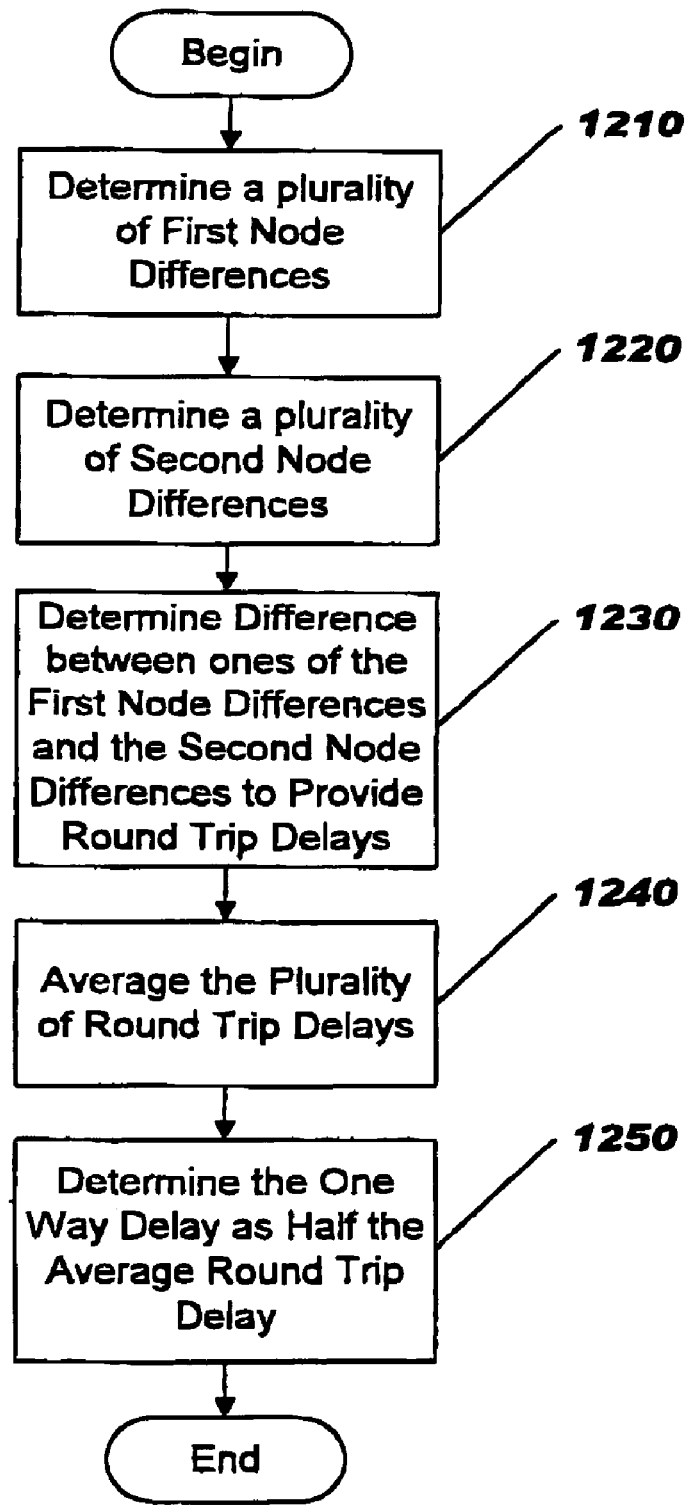
FIG. 12 is a flow chart illustrating operations for generating a one way delay based on a plurality of samples according to embodiments of the present invention.

Further embodiments of the present invention will now be discussed with reference to the flowcharts in FIGS. 10-12. Now referring to FIG. 10, a flowchart illustrating operations of clock synchronization according to further embodiments of the present invention will be discussed. Operations begin at block 1010 by maintaining a virtual second node clock at a first node. The virtual second node clock may be based on a first node clock and a timing record received from a second node based on a second node clock. Maintaining the virtual second node clock may include updating the virtual second node clock based on subsequent timing records received from the second node.

Operations continue at block 1020 by maintaining a virtual third node clock at the first node. The virtual third node clock may be maintained based on the first node clock and a timing record received from a third node based on a third node clock. Maintaining the virtual third node clock may include updating the virtual third node clock based on subsequent timing records received from the third node.

Now referring to FIG. 11, a flow chart illustrating operations for synchronizing clocks according to further embodiments of the present invention will be discussed. Operations begin at block 1110 by generating a one way delay based on a plurality of transmission and reception times related to a plurality of request/response events between a first node and a second node. The plurality of request/response events may be made up of a plurality of clock requests from a first node to a second node and a plurality of corresponding responses to the clock request from the second node to the first node. Once the one way delay is generated, a virtual clock may be established based on the one way delay (block 1120).

Now referring to FIG. 12, a flow chart illustrating operations of generating a one way delay based on a plurality of request/response events will be discussed. Operations begin at block 1210 by determining a plurality of first node differences. A first node difference may be the difference between a transmission time of the clock request from the first node to the second node and the reception time of the corresponding response at the first node. A first difference may be determined for each of the request/response events.

A plurality of second differences may be determined (block 1220). A second difference may be the difference between a reception time of the clock request at the second node and a transmission time of the corresponding response from the second node to the first node. A second difference may be determined for each request/response event. A difference between ones of the first node differences and the second node differences may be determined to provide a plurality of round trip delays (block 1230). The plurality of round trip delays may be averaged to provide an average round trip delay (block 1240). The one way delay may be determined, for example, using equation (2) set out above, where the RTD is the average round trip delay (block 1250).

It will be understood that the block diagram and circuit diagram illustrations of FIGS. 1-12 and combinations of blocks in the block and circuit diagrams may be implemented using discrete and integrated electronic circuits. It will also be appreciated that blocks of the block diagram and circuit illustration of FIGS. 1-12 and combinations of blocks in the block and circuit diagrams may be implemented using components other than those illustrated in FIGS. 1-12, and that, in general, various blocks of the block and circuit diagrams and combinations of blocks in the block and circuit diagrams, may be implemented in special purpose hardware such as discrete analog and/or digital circuitry, combinations of integrated circuits or one or more application specific integrated circuits (ASICs).

Accordingly, blocks of the circuit and block diagrams of FIGS. 1-12 support electronic circuits or modules and other means for performing the specified operations, as well as combinations of operations. It will be understood that the circuits and other means supported by each block and combinations of blocks can be implemented by special purpose hardware, software or firmware operating on special or general purpose data processors, or combinations thereof. It should also be noted that, in some alternative implementations, the operations noted in the blocks may occur out of the order noted in the figures. For example, two blocks shown in succession may, in fact, be executed substantially concurrently, or the blocks may sometimes be executed in the reverse order.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. In the claims, means-plus-function clauses are intended to cover the structures described herein as performing the recited function and not only structural equivalents but also equivalent structures. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

What is claimed is:

1. A method for synchronizing a first node clock at a first node of a computer network and a second node clock at a second node of the computer network comprising:

establishing an initial value of a virtual second node clock at the first node based on the first node clock and a timing record received from the second node based on a second node clock responsive to a clock request from the first node to the second node;

determining a frequency bias adjustment factor for the virtual second node clock based on time spaced ones of a plurality of clock requests from the first node and a plurality of corresponding responses from the second node, ones of the responses from the second node including a timing record based on the second node clock; and providing a time of the virtual second node clock based on the frequency bias adjustment factor responsive to requests for the virtual second node clock at a time between ones of the plurality of clock requests.

2. The method according to claim 1 further comprising establishing an updated initial value of the virtual second node clock based on one of the plurality of corresponding responses from the second node.

3. The method according to claim 1, wherein establishing a virtual second node clock comprises:

determining a one way delay between the first node and the second node based on a time of transmission of the clock request from the first node and a time of receipt of the corresponding response from the second node at the first node.

4. The method according to claim 3, wherein determining a one way delay further comprises:

determining the difference between the time of receipt and the time of transmission to provide a round trip delay; and determining the one way delay as half the round trip delay.

5. The method according to claim 1 further comprising:

establishing an updated initial value of a virtual second node clock at the first node based on the first node clock and a timing record from one of the plurality of corresponding responses from the second node based on a second node clock responsive to a clock request from the first node to the second node;

determining a jitter based on a comparison of the updated initial value of the virtual second node clock and a calculated value of the virtual second node clock based on the initial value of the virtual second node clock; and determining a skew rate for the second node clock based on the determined jitter.

6. The method of claim 5 further comprising determining if the skew rate satisfies an acceptance criteria;

entering a long polling mode having an associated resynchronization period if the skew rate satisfies the acceptance criteria; and entering a short polling mode having an associated resynchronization period if the skew rate does not satisfy the acceptance criteria, wherein the resynchronization period of the long polling mode is longer than the resynchronization period of the short polling mode.

7. The method of claim 6, wherein entering long polling mode includes using the skew rate as a phase adjustment.

8. The method of claim 6 wherein the resynchronization period of the long polling mode is greater than about twenty minutes and wherein the resynchronization period of the short polling mode is less than about five minutes.

9. The method of claim 6 further comprising adaptively determining the resynchronization period of the long polling mode based on the jitter.

10. The method of claim 9 further comprising:

determining if the jitter is greater than a first criterion;

shortening the resynchronization period of the long polling mode if the jitter is greater than the first criterion;

determining if the jitter is less than a second criterion;

extending the resynchronization period of the long polling mode if the jitter is less than the second criterion; and maintaining the resynchronization period of the long polling mode if the jitter is not greater than the first criterion or less than the second criterion.

11. The method of claim 6 further comprising adaptively determining the resynchronization period of the short polling mode based on the jitter.

12. The method of claim 11 further comprising:

determining if the jitter is greater than a first criterion;

shortening the resynchronization period of the short polling mode if the jitter is greater than the first criterion;

determining if the jitter is less than a second criterion;

extending the resynchronization period of the short polling mode if the jitter is less than the second criterion; and maintaining the resynchronization period of the short polling mode if the jitter is not greater than the first criterion or less than the second criterion.

13. A method for synchronizing clocks at a plurality of nodes of a network comprising:

maintaining a virtual second node clock at a first of the nodes based on a clock of the first of the nodes and a timing record received from a second of the nodes based on a clock of the second of the nodes; and maintaining a virtual third node clock at the first of the nodes based on the clock of the first of the nodes and a timing record received from a third of the nodes based on a clock of the third of the nodes.

14. The method of claim 13 wherein maintaining a virtual second node clock comprises updating the virtual second node clock based on subsequent timing records received from the second of the nodes to provide an updated virtual second node clock; and wherein maintaining a virtual third node clock comprises updating the virtual third node clock based on subsequent timing records received from the third of the nodes to provide an updated virtual third node clock.

15. The method of claim 14, further comprising determining a frequency bias adjustment factor for the virtual second node clock based on time spaced ones of a plurality of clock requests from the first of the nodes and a plurality of corresponding responses from the second of the nodes;

providing a time of the virtual second node clock based on the frequency bias adjustment factor responsive to requests for the virtual second node clock at a time between ones of the plurality of clock requests;

determining a frequency bias adjustment factor for the virtual third node clock based on time spaced ones of a plurality of clock requests from the first of the nodes and a plurality of corresponding responses from the third of the nodes; and providing a time of the virtual third node clock based on the frequency bias adjustment factor responsive to requests for the virtual third node clock at a time between ones of the plurality of clock requests.

16. The method of claim 15, further comprising:

determining a jitter for the virtual second node clock based on a comparison of the updated virtual second node clock and a calculated value of the virtual second node clock;

determining a skew rate for the second node clock based on the determined jitter;

determining a value for the virtual second node clock based on the determined frequency bias and the determined skew rate;

determining a jitter for the virtual third node clock based on a comparison of the updated virtual third node clock and a calculated value of the virtual third node clock;

determining a skew rate for the virtual third node clock based on the determined jitter; and determining a value for the virtual third node clock based on the determined frequency bias and the determined skew rate.

17. A method for synchronizing a first node clock at a first node of a computer network and a second node clock at a second node of the computer network based on a plurality of clock requests from the first node and a plurality of corresponding responses from the second node comprising:

generating a one way delay based on transmission times of the plurality of clock requests from the first node and a plurality of reception times of the plurality of corresponding responses from the second node; and establishing a virtual clock at the first node of the computer network based on the generated one way delay.

18. The method according to claim 17 wherein generating a one way delay further comprises:

determining the difference between ones of the transmission times of the plurality of clock requests from the first node to the second node and ones of the reception times of the plurality of corresponding responses at the first node to provide a plurality of first node differences;

determining the difference between a plurality of reception times of the plurality of clock requests at the second node a plurality of transmission times of the plurality of corresponding responses from the second node to the first node to provide and a plurality of second node differences;

determining the difference between ones of the first node differences and the second node differences to provide a plurality of round trip delays;

averaging the plurality of round trip delays to provide an average round trip delay; and determining the one way delay as half the average round trip delay.

19. A system for synchronizing a first node clock at a first node of a computer network and a second node clock at a second node of the computer network, the system comprising:

a virtual clock circuit that establishes an initial value of a virtual second node clock at the first node based on the first node clock and a timing record received from the second node based on a second node clock responsive to a clock request from the first node to the second node;

a frequency bias circuit that determines a frequency bias adjustment factor for the virtual second node clock based on time spaced ones of a plurality of clock requests from the first node and a plurality of corresponding responses from the second node, ones of the responses from the second node including a timing record based on the second node clock; and a provider circuit that provides a time of the virtual second node clock based on the frequency bias adjustment factor responsive to requests for the virtual second node clock at a time between ones of the plurality of clock requests.

20. The system of claim 19 wherein the virtual clock circuit is further configured to establish an updated initial value of the virtual second node clock based on ones of the plurality of corresponding responses from the second node.

21. The system of claim 19, wherein the virtual clock is further configured to:

determine a one way delay between the first node and the second node based on a time of transmission of the clock request from the first node and a time of receipt of the corresponding response from the second node at the first node.

22. The system of claim 21, wherein the virtual clock circuit is further configured to:

determine the difference between the time of receipt and the time of transmission to provide a round trip delay; and determine the one way delay as half the round trip delay.

23. The system of claim 19 wherein the virtual clock circuit further comprises:

a jitter calculation circuit that is configured to establish an updated initial value of a virtual second node clock at the first node based on the first node clock and a timing record from one of the plurality of corresponding responses from the second node based on a second node clock responsive to a clock request from the first node to the second node and determine a jitter based on a comparison of the updated initial value of the virtual second node clock and a calculated value of the virtual second node clock based on the initial value of the virtual second node clock; and a skew calculation circuit that is configured to determine a skew rate for the second node clock based on the determined jitter.

24. The system of claim 23 wherein the virtual clock circuit further comprises:

a clock adjustment circuit that determines if the skew rate satisfies an acceptance criteria and is configured to:

enter a long polling mode having an associated resynchronization period if the skew rate satisfies the acceptance criteria; and enter a short polling mode having an associated resynchronization period if the skew rate does not satisfy the acceptance criteria, wherein the resynchronization period of the long polling mode is longer than the resynchronization period of the short polling mode.

25. The system of claim 24, wherein the clock adjustment circuit is further configured to use the skew rate as a phase adjustment if long polling mode is entered.

26. The system of claim 24 wherein the resynchronization period of the long polling mode is greater than twenty minutes and wherein the resynchronization period of the short polling mode is less than five minutes.

27. The system of claim 24 wherein the virtual clock circuit is further configured to adaptively determine the resynchronization period of the long polling mode based on the jitter.

28. The system of claim 27 wherein the virtual clock circuit is further configured to:

determine if the jitter is greater than a first criterion;

shorten the resynchronization period of the long polling mode if the jitter is greater than the first criterion;

determine if the jitter is less than a second criterion;

extend the resynchronization period of the long polling mode if the jitter is less than the second criterion; and maintain the resynchronization period of the long polling mode if the jitter is not greater than the first criterion or less than the second criterion.

29. The system of claim 24 wherein the virtual clock circuit is further configured to adaptively determine the resynchronization period of the short polling mode based on the jitter.

30. The system of claim 29 wherein the virtual clock circuit is further configured to:

determine if the jitter is greater than a first criterion;

shorten the resynchronization period of the short polling mode if the jitter is greater than the first criterion;

determine if the jitter is less than a second criterion;

extend the resynchronization period of the short polling mode if the jitter is less than the second criterion; and maintain the resynchronization period of the short polling mode if the jitter is not greater than the first criterion or less than the second criterion.

31. A system for synchronizing clocks at a plurality of nodes of a network, the system comprising:

a clock synchronization module that maintains a virtual second node clock at a first of the nodes based on a clock of the first of the nodes and timing records received from a second of the nodes based on a clock of the second of the nodes and maintains a virtual third node clock at the first of the nodes based on the clock of the first of the nodes and timing records received from a third of the nodes based on a clock of the third of the nodes.

32. The system of claim 31 wherein the clock synchronization module further comprises a virtual clock circuit that is configured to update the virtual second node clock based on subsequent timing records received from the second of the nodes to provide an updated virtual second node clock and to update the virtual third node clock based on subsequent timing records received from the third of the nodes to provide an updated virtual third node clock.

33. The system of claim 32, wherein the clock synchronization module further comprises:

a frequency bias circuit that is configured to determine a frequency bias adjustment factor for the virtual second node clock based on time spaced ones of a plurality of clock requests from the first of the nodes and a plurality of corresponding responses from the second of the nodes and to determine a frequency bias adjustment factor for the virtual third node clock based on time spaced ones of a plurality of clock requests from the first of the nodes and a plurality of corresponding responses from the third of the nodes; and a provider circuit that is configured to provide a time of the virtual second node clock based on the frequency bias adjustment factor responsive to requests for the virtual second node clock at a time between ones of the plurality of clock requests and to provide a time of the virtual third node clock based on the frequency bias adjustment factor responsive to requests for the virtual third node clock at a time between ones of the plurality of clock requests.

34. The system of claim 33, wherein the virtual clock circuit further comprises:

a jitter calculation circuit that is configured to determine a jitter for the virtual second node clock based on a comparison of the updated virtual second node clock and a calculated value of the virtual second node clock and to determine a jitter for the virtual third node clock based on a comparison of the updated virtual third node clock and a calculated value of the virtual third node clock;

a skew calculation circuit that is configured to determine a skew rate for the second node clock based on the determined jitter and to determine a skew rate for the virtual third node clock based on the determined jitter; and a clock adjust circuit configured to determine a value for the virtual second node clock based on the determined frequency bias and the determined skew rate and to determine a value for the virtual third node clock based on the determined frequency bias and the determined skew rate.

35. A system for synchronizing a first node clock at a first node of a computer network and a second node clock at a second node of the computer network based on a plurality of clock requests from the first node and a plurality of corresponding responses from the second node, the system comprising:

a virtual clock circuit that generates a one way delay based on transmission times of the plurality of clock requests from the first node and a plurality of reception time of the plurality of corresponding responses from the second node and establishes a virtual clock at the first node of the computer network based on the generated one way delay.

36. The system claim 35 wherein the virtual clock circuit is further configured to:

determine the difference between ones of the reception times of the plurality of corresponding responses at the first node and ones of the transmission times of the plurality of clock requests from the first node to the second node to provide a plurality of first node differences;

determine the difference between a plurality of transmission times of the plurality of corresponding responses from the second node to the first node and a plurality of reception times of the plurality of clock requests at the second node to provide a plurality of second node differences; and determine the difference between ones of the first node differences and the second node differences to provide a plurality of round trip delays;

average the plurality of round trip delays to provide an average round trip delay; and determine the one way delay as half the average round trip delay.

37. A system for synchronizing a first node clock at a first node of a computer network and a second node clock at a second node of the computer network, the system comprising:

means for establishing an initial value of a virtual second node clock at the first node based on the first node clock and a timing record received from the second node based on a second node clock responsive to a clock request from the first node to the second node;

means for determining a frequency bias adjustment factor for the virtual second node clock based on time spaced ones of a plurality of clock requests from the first node and a plurality of corresponding responses from the second node, ones of the responses from the second node including a timing record based on the second node clock; and means for providing a time of the virtual second node clock based on the frequency bias adjustment factor responsive to requests for the virtual second node clock at a time between ones of the plurality of clock requests.

38. The system of claim 37 further comprising means for establishing an updated initial value of the virtual second node clock based on one of the plurality of corresponding responses from the second node.

39. The system of claim 37, wherein the means for establishing a virtual second node clock comprises:

means for determining a one way delay between the first node and the second node based on a time of transmission of the clock request from the first node and a time of receipt of the corresponding response from the second node at the first node.

40. The system of claim 39, wherein the means for determining a one way delay further comprises:

means for determining the difference between the time of receipt and the time of transmission to provide a round trip delay; and means for determining the one way delay as half the round trip delay.

41. The system of claim 37 further comprising:

means for establishing an updated initial value of a virtual second node clock at the first node based on the first node clock and a timing record from one of the plurality of corresponding responses from the second node based on a second node clock responsive to a clock request from the first node to the second node;

means for determining a jitter based on a comparison of the updated initial value of the virtual second node clock and a calculated value of the virtual second node clock based on the initial value of the virtual second node clock; and means for determining a skew rate for the second node clock based on the determined jitter.

42. The system of claim 41 further comprising
means for determining if the skew rate satisfies an acceptance criteria;
means for entering a long polling mode having an associated resynchronization period if the skew rate satisfies the acceptance criteria; and
means for entering a short polling mode having an associated resynchronization period if the skew rate does not satisfy the acceptance criteria, wherein the resynchronization period of the long polling mode is longer than the resynchronization period of the short polling mode.

43. The system of claim 42, wherein means for entering long polling mode includes means for using the skew rate as a phase adjustment.

44. The system of claim 42 further comprising means for adaptively determining the resynchronization period of the long polling mode based on the jitter.

45. The system of claim 44 further comprising:
means for determining if the jitter is greater than a first criterion;
means for shortening the resynchronization period of the long polling mode if the jitter is greater than the first criterion;
means for determining if the jitter is less than a second criterion;
means for extending the resynchronization period of the long polling mode if the jitter is less than the second criterion; and
means for maintaining the resynchronization period of the long polling mode if the jitter is not greater than the first criterion or less than the second criterion.

46. The system of claim 42 further comprising means for adaptively determining the resynchronization period of the short polling mode based on the jitter.

47. The system of claim 46 further comprising:
means for determining if the jitter is greater than a first criterion;
means for shortening the resynchronization period of the short polling mode if the jitter is greater than the first criterion;
means for determining if the jitter is less than a second criterion;
means for extending the resynchronization period of the short polling mode if the jitter is less than the second criterion; and
means for maintaining the resynchronization period of the short polling mode if the jitter is not greater than the first criterion or less than the second criterion.

48. A system for synchronizing clocks at a plurality of nodes of a network, the system comprising:
means for maintaining a virtual second node clock at a first of the nodes based on a clock of the first of the nodes and a timing record received from a second of the nodes based on a clock of the second of the nodes; and
means for maintaining a virtual third node clock at the first of the nodes based on the clock of the first of the nodes and a timing record received from a third of the nodes based on a clock of the third of the nodes.

49. The system of claim 48 wherein means for maintaining a virtual second node clock comprises means for updating the virtual second node clock based on subsequent timing records received from the second of the nodes to provide an updated virtual second node clock; and
wherein means for maintaining a virtual third node clock comprises means for updating the virtual third node clock based on subsequent timing records received from the third of the nodes to provide an updated virtual third node clock.

50. The system of claim 49, further comprising
means for determining a frequency bias adjustment factor for the virtual second node clock based on time spaced ones of a plurality of clock requests from the first of the nodes and a plurality of corresponding responses from the second of the nodes;
means for providing a time of the virtual second node clock based on the frequency bias adjustment factor responsive to requests for the virtual second node clock at a time between ones of the plurality of clock requests;
means for determining a frequency bias adjustment factor for the virtual third node clock based on time spaced ones of a plurality of clock requests from the first of the nodes and a plurality of corresponding responses from the third of the nodes; and
means for providing a time of the virtual third node clock based on the frequency bias adjustment factor responsive to requests for the virtual third node clock at a time between ones of the plurality of clock requests.

51. The system of claim 50, further comprising:
means for determining a jitter for the virtual second node clock based on a comparison of the updated virtual second node clock and a calculated value of the virtual second node clock;
means for determining a skew rate for the second node clock based on the determined jitter;
means for determining a value for the virtual second node clock based on the determined frequency bias and the determined skew rate;
means for determining a jitter for the virtual third node clock based on a comparison of the updated virtual third node clock and a calculated value of the virtual third node clock;
means for determining a skew rate for the virtual third node clock based on the determined jitter; and
means for determining a value for the virtual third node clock based on the determined frequency bias and the determined skew rate.

52. A system for synchronizing a first node clock at a first node of a computer network and a second node clock at a second node of the computer network based on a plurality of clock requests from the first node and a plurality of corresponding responses from the second node, the system comprising:
means for generating a one way delay based on transmission times of the plurality of clock requests from the first node and a plurality of reception times of the plurality of corresponding responses from the second node; and
means for establishing a virtual clock at the first node of the computer network based on the generated one way delay.

53. The system of claim 52 wherein generating a one way delay further comprises:
means for determining the difference between ones of the transmission times of the plurality of clock requests from the first node to the second node and ones of the reception times of the plurality of corresponding responses at the first node to provide a plurality of first node differences;

means for determining the difference between a plurality of reception times of the plurality of clock requests at the second node a plurality of transmission time of the plurality of corresponding responses from the second node to the first node to provide and a plurality of second node differences;

means for determining the difference between ones of the first node differences and the second node differences to provide a plurality of round trip delays;

means for averaging the plurality of round trip delays to provide an average round trip delay; and means for determining the one way delay as half the average round trip delay.

54. A computer program product for synchronizing a first node clock at a first node of a computer network and a second node clock at a second node of the computer network, the computer program product comprising:

a computer-readable storage medium having computer-readable program code embodied in said medium, said computer-readable program code comprising:

computer readable program code which establishes an initial value of a virtual second node clock at the first node based on the first node clock and a timing record received from the second node based on a second node clock responsive to a clock request from the first node to the second node;

computer readable program code which determines a frequency bias adjustment factor for the virtual second node clock based on time spaced ones of a plurality of clock requests from the first node and a plurality of corresponding responses from the second node, ones of the responses from the second node including a timing record based on the second node clock; and computer readable program code which provides a time of the virtual second node clock based on the frequency bias adjustment factor responsive to requests for the virtual second node clock at a time between ones of the plurality of clock requests.

55. The computer program product of claim 54 further comprising computer readable code which establishes an updated initial value of the virtual second node clock based on one of the plurality of corresponding responses from the second node.

56. The computer program product of claim 54, wherein the computer readable code which establishes a virtual second node clock comprises:

computer readable code which determines a one way delay between the first node and the second node based on a time of transmission of the clock request from the first node and a time of receipt of the corresponding response from the second node at the first node.

57. The computer program product of claim 56, wherein the computer readable code which determines a one way delay further comprises:

computer readable code which determines the difference between the time of receipt and the time of transmission to provide a round trip delay; and computer readable program code which determines the one way delay as half the round trip delay.

58. The computer program product of claim 54 further comprising:

computer readable program code which establishes an updated initial value of a virtual second node clock at the first node based on the first node clock and a timing record from one of the plurality of corresponding responses from the second node based on a second node clock responsive to a clock request from the first node to the second node;

computer readable program code which determines a jitter based on a comparison of the updated initial value of the virtual second node clock and a calculated value of the virtual second node clock based on the initial value of the virtual second node clock; and computer readable program code which determines a skew rate for the second node clock based on the determined jitter.

59. The computer program product of claim 58 further comprising computer readable program code which determines if the skew rate satisfies an acceptance criteria;

computer readable program code which enters a long polling mode having an associated resynchronization period if the skew rate satisfies the acceptance criteria; and computer readable program code which enters a short polling mode having an associated resynchronization period if the skew rate does not satisfy the acceptance criteria, wherein the resynchronization period of the long polling mode is longer than the resynchronization period of the short polling mode.

60. The computer program product of claim 59, wherein the computer readable code which enters long polling mode includes computer readable program code for using the skew rate as a phase adjustment.

61. The computer program product of claim 59 further comprising computer readable program code for adaptively determining the resynchronization period of the long polling mode based on the jitter.

62. The computer program product of claim 61 further comprising:

computer readable program code which determines if the jitter is greater than a first criterion;

computer readable program code that shortens the resynchronization period of the long polling mode if the jitter is greater than the first criterion;

computer readable program code which determines if the jitter is less than a second criterion;

computer readable program code which extends the resynchronization period of the long polling mode if the jitter is less than the second criterion; and computer readable program code which maintains the resynchronization period of the long polling mode if the jitter is not greater than the first criterion or less than the second criterion.

63. The computer program product of claim 59 further comprising computer readable program code which adaptively determines the resynchronization period of the short polling mode based on the jitter.

64. The computer program product of claim 63 further comprising:

computer readable program code which determines if the jitter is greater than a first criterion;

computer readable program code which shortens the resynchronization period of the short polling mode if the jitter is greater than the first criterion;

computer readable program code which determines if the jitter is less than a second criterion;

computer readable program code which extends the resynchronization period of the short polling mode if the jitter is less than the second criterion; and computer readable program code which maintains the resynchronization period of the short polling mode if the jitter is not greater than the first criterion or less than the second criterion.

65. A computer program product for synchronizing clocks at a plurality of nodes of a network, the computer program product comprising:
   a computer-readable storage medium having computer-readable program code embodied in said medium, said computer-readable program code comprising:
   computer-readable program code which maintains a virtual second node clock at a first of the nodes based on a clock of the first of the nodes and a timing record received from a second of the nodes based on a clock of the second of the nodes; and
   computer-readable program code which maintains a virtual third node clock at the first of the nodes based on the clock of the first of the nodes and a timing record received from a third of the nodes based on a clock of the third of the nodes.

66. The computer program product of claim 65 wherein computer readable program code which maintains a virtual second node clock comprises computer readable program code which updates the virtual second node clock based on subsequent timing records received from the second of the nodes to provide an updated virtual second node clock; and
   wherein computer readable program code which maintains a virtual third node clock comprises computer readable program code which updates the virtual third node clock based on subsequent timing records received from the third of the nodes to provide an updated virtual third node clock.

67. The computer program product of claim 66, further comprising
   computer readable program code which determines a frequency bias adjustment factor for the virtual second node clock based on time spaced ones of a plurality of clock requests from the first of the nodes and a plurality of corresponding responses from the second of the nodes;
   computer readable program code which provides a time of the virtual second node clock based on the frequency bias adjustment factor responsive to requests for the virtual second node clock at a time between ones of the plurality of clock requests;
   computer readable program code which determines a frequency bias adjustment factor for the virtual third node clock based on time spaced ones of a plurality of clock requests from the first of the nodes and a plurality of corresponding responses from the third of the nodes; and
   computer readable program code which provides a time of the virtual third node clock based on the frequency bias adjustment factor responsive to requests for the virtual third node clock at a time between ones of the plurality of clock requests.

68. The computer program product of claim 67, further comprising:
   computer readable program code which determines a jitter for the virtual second node clock based on a comparison of the updated virtual second node clock and a calculated value of the virtual second node clock;
   computer readable program code which determines a skew rate for the second node clock based on the determined jitter;
   computer readable program code which determines a value for the virtual second node clock based on the determined frequency bias and the determined skew rate;
   computer readable program code which determines a jitter for the virtual third node clock based on a comparison of the updated virtual third node clock and a calculated value of the virtual third node clock;
   computer readable program code which determines a skew rate for the virtual third node clock based on the determined jitter; and
   computer readable program code which determines a value for the virtual third node clock based on the determined frequency bias and the determined skew rate.

69. A computer program product for synchronizing a first node clock at a first node of a computer network and a second node clock at a second node of the computer network based on a plurality of clock requests from the first node and a plurality of corresponding responses from the second node, the computer program product comprising:
   a computer-readable storage medium having computer-readable program code embodied in said medium, said computer-readable program code comprising:
   computer readable program code which generates a one way delay based on transmission times of the plurality of clock requests from the first node and a plurality of reception times of the plurality of corresponding responses from the second node; and
   computer readable program code which establishes a virtual clock at the first node of the computer network based on the generated one way delay.

70. The computer program product of claim 69 wherein computer readable program code which generates a one way delay further comprises:
   computer readable program code which determines the difference between ones of the transmission times of the plurality of clock requests from the first node to the second node and ones of the reception times of the plurality of corresponding responses at the first node to provide a plurality of first node differences;
   computer readable program code which determines the difference between a plurality of reception times of the plurality of clock requests at the second node a plurality of transmission times of the plurality of corresponding responses from the second node to the first node to provide and a plurality of second node differences;
   computer readable program code which determines the difference between ones of the first node differences and the second node differences to provide a plurality of round trip delays;
   computer readable program code which averages the plurality of round trip delays to provide an average round trip delay; and
   computer readable program code which determines the one way delay as half the average round trip delay.

* * * * *